United States Patent
Nakano et al.

(10) Patent No.: US 10,256,869 B2
(45) Date of Patent: Apr. 9, 2019

(54) COMMUNICATION APPARATUS AND COMMUNICATION METHOD

(71) Applicant: Sony Corporation, Tokyo (JP)

(72) Inventors: Hiroaki Nakano, Tokyo (JP); Masayoshi Abe, Tokyo (JP); Hiroaki Fujita, Kanagawa (JP); Hiroshi Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/765,893

(22) PCT Filed: Oct. 26, 2016

(86) PCT No.: PCT/JP2016/081700
§ 371 (c)(1),
(2) Date: Apr. 4, 2018

(87) PCT Pub. No.: WO2017/082051
PCT Pub. Date: May 18, 2017

(65) Prior Publication Data
US 2018/0287669 A1    Oct. 4, 2018

(30) Foreign Application Priority Data

Nov. 9, 2015  (JP) ................................ 2015-219416

(51) Int. Cl.
*H04B 17/00* (2015.01)
*H04B 5/00* (2006.01)
(Continued)

(52) U.S. Cl.
CPC ............. *H04B 5/0068* (2013.01); *H04B 1/59* (2013.01); *H04B 5/02* (2013.01); *H04B 17/0085* (2013.01); *H04B 17/0087* (2013.01); *H04L 7/041* (2013.01)

(58) Field of Classification Search
CPC .......... H04B 5/0068; H04B 1/59; H04B 5/02; H04B 17/0085; H04B 17/0087
(Continued)

(56) References Cited

U.S. PATENT DOCUMENTS 8,934,836 B2 *  1/2015  Lefley ................. H04B 5/0075
                                                340/10.1
9,281,874 B2 *  3/2016  Lefley ................. H04B 5/0075
(Continued)

FOREIGN PATENT DOCUMENTS

JP    2008-147912 A    6/2008
JP    2011-078040 A    4/2011

*Primary Examiner* — Sonny Trinh
(74) *Attorney, Agent, or Firm* — Michael Best & Friedrich LLP

(57) ABSTRACT

This technology relates to a communication apparatus and a communication method adapted to improve the deterioration of communication performance due to variations in parts, for example.

A test signal generating section generates a predetermined test signal. A detecting section detects, given a received test signal obtained by a transmitting and receiving section upon receipt of the test signal, an influence parameter affecting the intensity of an active load modulation signal that combines a transmission carrier with a synchronizing signal synchronized with a received signal obtained upon receipt of the transmission carrier. A controlling section controls the intensity of the active load modulation signal in accordance with the influence parameter. This technology applies to cases where short-range wireless communication is performed using magnetic fields.

9 Claims, 14 Drawing Sheets

(51) Int. Cl.
*H04B 1/59* (2006.01)
*H04B 5/02* (2006.01)
*H04L 7/04* (2006.01)

(58) Field of Classification Search
USPC ... 455/41.1, 423, 67.11, 67.14, 115.1, 115.2, 455/226.1
See application file for complete search history.

(56) References Cited

U.S. PATENT DOCUMENTS

| | | | |
|---|---|---|---|
| 9,513,609 B2* | 12/2016 | Thueringer | G05B 13/02 |
| 9,673,964 B2* | 6/2017 | Ghahramani | H04L 7/0012 |
| 9,985,732 B2* | 5/2018 | Cordier | G06K 7/0095 |
| 2013/0288599 A1* | 10/2013 | Bernard | G06K 19/0723 |
| | | | 455/41.1 |
| 2014/0003548 A1 | 1/2014 | Lefley | |

* cited by examiner

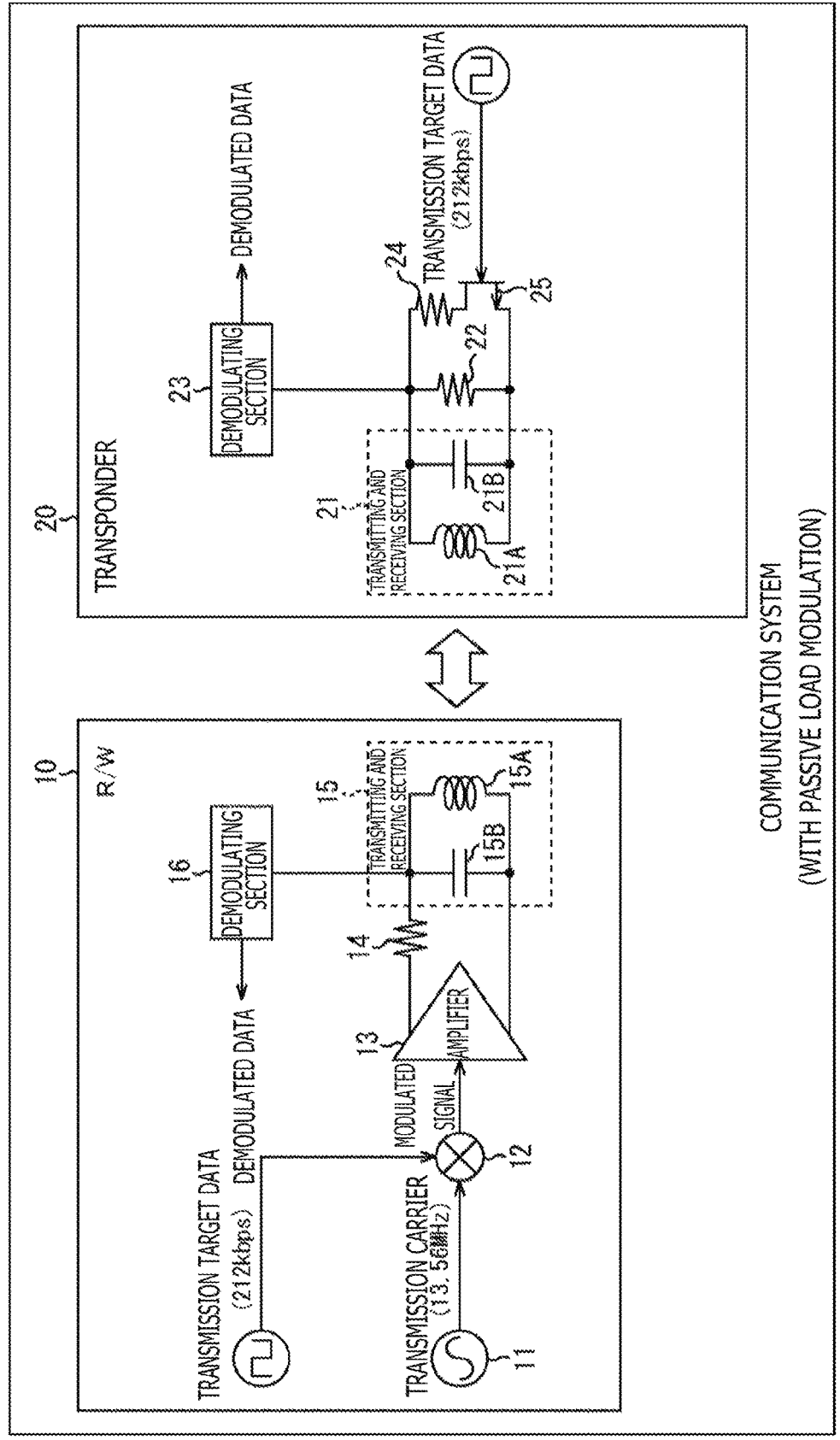

FIG. 6

| | RESONANCE FREQUENCY (MHz) | PHASE THETA (°) OF SYNCHRONIZING SIGNAL | | | | | | | | | | |
|---|---|---|---|---|---|---|---|---|---|---|---|---|
| | | 0 | 15 | 30 | 45 | 60 | 75 | 90 | 105 | 120 | 135 | 150 |
| R/W-A | 13.31 | ○ | ○ | ○ | ○ | ○ | ○ | ○ | ○ | △ | △ | △ |
| | 13.56 | △ | ○ | ○ | ○ | ○ | ○ | ○ | ○ | ○ | △ | △ |
| | 13.81 | △ | △ | △ | ○ | ○ | ○ | ○ | ○ | ○ | ○ | ○ |

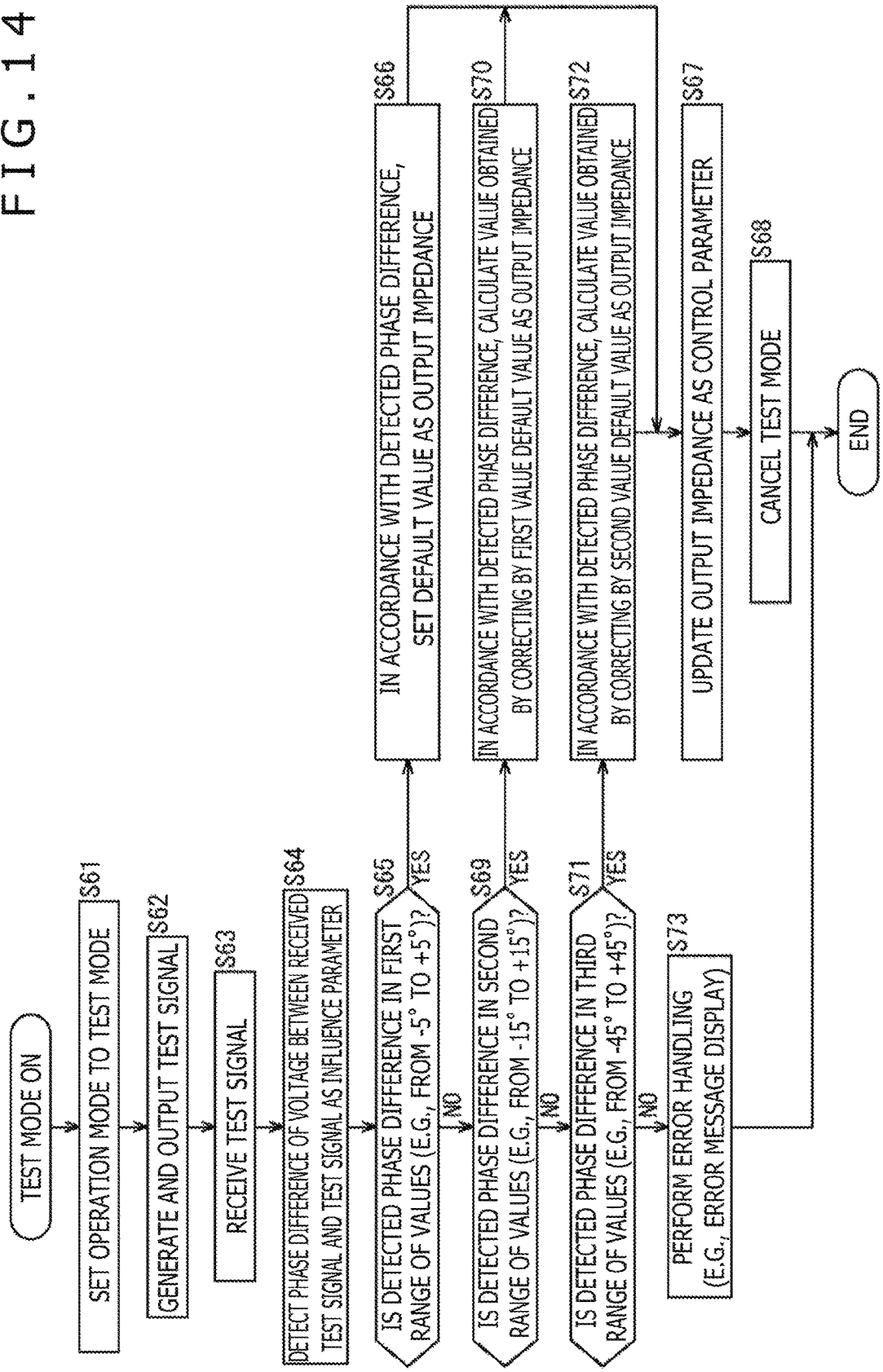
F I G . 1 4

COMMUNICATION APPARATUS AND COMMUNICATION METHOD

TECHNICAL FIELD

The present technology relates to a communication apparatus and a communication method. More particularly, the technology relates to a communication apparatus and a communication method adapted to improve the deterioration of communication performance due to variations in parts, for example.

BACKGROUND ART

NFC (Near Field Communication), an international standard, has been known as one example of the technology of short-range wireless communication. The NFC has gained growing acceptance primarily in Asian countries for use in such applications as payment of fares for public transportation, accounting, and authentication, for example.

The NFC is used extensively in smartphones. In the future, the technology is expected to find its way into smaller devices such as wearable devices. Furthermore, miniaturization of the parts for implementing the NFC (-based) communication capability is expected so that the NFC will be applied to downsized devices.

The NFC communication takes place using magnetic fields between an R/W (Reader/Writer) and a transponder such as an IC (Integrated Circuit) card communicating with the R/W.

More specifically, the R/W and the transponder communicate with each other through electromagnetic induction between their coils acting as antennas.

Incidentally, the coils acting as the antennas in the R/W and the transponder constitute a resonant circuit each. The resonance frequency of the resonant circuit varies typically with variations in the parts making up the resonant circuit. If the resonance frequency deviates from its normal value (design value), the communication performance (characteristics) such as communicable distance deteriorates.

In view of that, techniques have been proposed for correcting the resonance frequency. The techniques involve transmitting an adjustment signal, receiving the transmitted signal, and adjusting a variable capacitor in accordance with the received signal to improve the deterioration of the communication performance typically attributable to variations in parts (e.g., see PTL 1).

CITATION LIST

Patent Literature

[PTL 1]
JP 2011-078040A

SUMMARY

Technical Problems

In the NFC communication, meanwhile, active load modulation is drawing attention as a technique for transmitting data from the transponder to the R/W.

Active load modulation involves getting the transponder to generate a synchronizing signal synchronized with a transmission carrier sent from the R/W. Transmission of the synchronizing signal is turned on and off in a manner reflecting transmission target data (i.e., data targeted for transmission). This generates a signal combining the transmission carrier with the synchronizing signal as an active load modulation signal in which the transmission carrier is modulated in accordance with the transmission target data.

Also in active load modulation, the resonance frequency of the R/W or of the transponder may deviate from the design value due to variations in parts, for example, so that the communication performance such as communicable distance may deteriorate.

The deterioration of the communication performance can be improved by correcting the resonance frequency through the use of the techniques described in PTL 1, for example.

However, the techniques of PTL 1 require a variable capacitor (or a capacitance bank) to be added into the transponder. Since the variable capacitor has a wide area and costs significantly, adding the variable capacitor will make the transponder larger in size and higher in cost.

The present technology has been made in view of the above circumstances. An object of the technology is therefore to improve the deterioration of communication performance due to variations in parts, for example, while minimizing increases in size and cost.

Solution to Problems

A communication apparatus according to the present technology includes: a test signal generating section configured to generate a predetermined test signal; a detecting section configured to detect an influence parameter affecting the intensity of an active load modulation signal that combines a transmission carrier transmitted by another communication apparatus and received by a transmitting and receiving section with a synchronizing signal transmitted by the transmitting and receiving section in synchronism with a received signal obtained upon receipt of the transmission carrier, the influence parameter being detected from a received test signal obtained upon receipt of the test signal; and a controlling section configured to control the intensity of the active load modulation signal in accordance with the influence parameter.

In the communication apparatus of the present technology, the predetermined test signal is first generated. Thereupon detected is the influence parameter affecting the intensity of the active load modulation signal that combines the transmission carrier transmitted by another communication apparatus and received by the transmitting and receiving section with the synchronizing signal transmitted by the transmitting and receiving section in synchronism with the received signal obtained upon receipt of the transmission carrier, the influence parameter being detected from the received test signal obtained upon receipt of the test signal. The intensity of the active load modulation signal is controlled in accordance with the influence parameter.

A first communication method according to the present technology includes: generating a predetermined test signal; and detecting an influence parameter affecting the intensity of an active load modulation signal that combines a transmission carrier transmitted by another communication apparatus and received by a transmitting and receiving section with a synchronizing signal transmitted by the transmitting and receiving section in synchronism with a received signal obtained upon receipt of the transmission carrier, the influence parameter being detected from a received test signal obtained upon receipt of the test signal. The intensity of the active load modulation signal is controlled in accordance with the influence parameter.

With the first communication method of the present technology, the predetermined test signal is first generated. Thereupon detected is the influence parameter affecting the intensity of the active load modulation signal that combines the transmission carrier transmitted by another communication apparatus and received by the transmitting and receiving section with the synchronizing signal transmitted by the transmitting and receiving section in synchronism with the received signal obtained upon receipt of the transmission carrier, the influence parameter being detected from the received test signal obtained upon receipt of the test signal. The influence parameter is used to control the intensity of the active load modulation signal.

A second communication method according to the present technology includes: generating a predetermined test signal; and detecting an influence parameter affecting the intensity of an active load modulation signal that combines a transmission carrier transmitted by another communication apparatus and received by a transmitting and receiving section with a synchronizing signal transmitted by the transmitting and receiving section in synchronism with a received signal obtained upon receipt of the transmission carrier, the influence parameter being detected from a received test signal obtained upon receipt of the test signal. The intensity of the active load modulation signal is controlled in accordance with the influence parameter thus obtained.

With the second communication method of the present technology, the predetermined test signal is first generated. Thereupon detected is the influence parameter affecting the intensity of the active load modulation signal that combines the transmission carrier transmitted by another communication apparatus and received by the transmitting and receiving section with the synchronizing signal transmitted by the transmitting and receiving section in synchronism with the received signal obtained upon receipt of the transmission carrier, the influence parameter being detected from the received test signal obtained upon receipt of the test signal. The intensity of the active load modulation signal is controlled in accordance with the influence parameter thus obtained.

Incidentally, the communication apparatus may be either an independent apparatus or an internal block constituting part of a single apparatus.

Advantageous Effect of Invention

According to the present technology, the deterioration of communication performance due to variations in parts, for example, is improved.

The advantageous effect outlined above is not limitative of the present disclosure. Further advantageous effects of the disclosure will become apparent from the ensuing description.

BRIEF DESCRIPTION OF DRAWINGS

FIG. 1 is a block diagram depicting a typical configuration of a communication system that performs short-range wireless communication using passive load modulation.

FIG. 6 is a tabular diagram depicting the results of simulations performed using a given R/W-A as an R/W 70.

FIG. 14 is a flowchart explaining an example of how the transponder 110 in test mode operates to adjust the output impedance of an outputting section 86 in controlling the intensity of the active load modulation signal.

DESCRIPTION OF EMBODIMENTS

Figure 2:
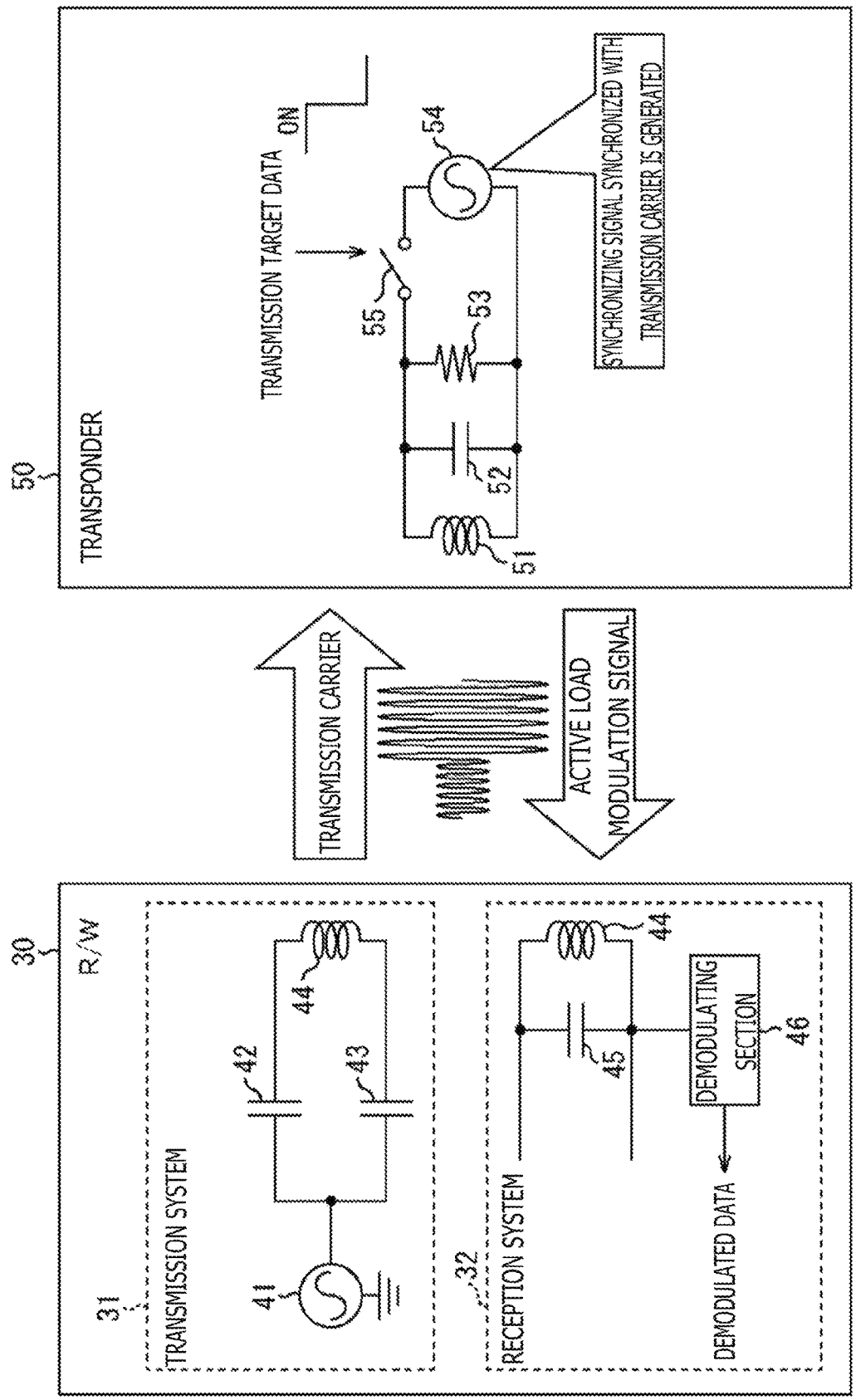
FIG. 2 is an explanatory diagram explaining an overview of active load modulation.

<Typical Configuration of the Communication System that Uses Passive Load Modulation>

FIG. 1 is a block diagram depicting a typical configuration of a communication system that performs short-range wireless communication using passive load modulation.

The description hereunder will deal with NFC communication as an example of short-range wireless communication. However, short-range wireless communication is not limited to the NFC communication.

In FIG. 1, the communication system includes an R/W 10 and a transponder 20. The NFC communication takes place using magnetic fields between the R/W 10 and the transponder 20.

The R/W 10 includes a carrier generating section 11, a modulating section 12, an amplifier 13, a resistor 14, a transmitting and receiving section 15, and a demodulating section 16.

The carrier generating section 11 generates as a transmission carrier a sine wave with a predetermined frequency of 13.56 MHz, for example. The carrier generating section 11 supplies the generated transmission carrier to the modulating section 12.

In a case where the R/W 10 transmits data to the transponder 20, the modulating section 12 is supplied with transmission target data to be transmitted from the R/W 10 to the transponder 20 at a predetermined rate of 212 kbps (bit per second), for example.

In accordance with the transmission target data, the modulating section 12 modulates the transmission carrier by ASK. (Amplitude Shift Keying), for example. The modulating section 12 supplies the resulting ASK-modulated signal to the amplifier 13.

Alternatively, the modulating section 12 supplies the transmission carrier generated by the carrier generating section 11 to the amplifier 13 without modulating the carrier.

The amplifier 13 amplifies the ASK-modulated signal or the transmission carrier from the modulating section 12, and supplies the amplified signal or transmission carrier to the transmitting and receiving section 15 via the resistor 14.

The transmitting and receiving section 15 includes a coil 15A acting as an antenna and a capacitor 15B, which make up a resonant circuit.

The transmitting ant receiving section 15 converts the ASK-modulated signal or the transmission carrier from the amplifier 13 into magnetic field changes and transmits the resulting magnetic field changes.

Also, the transmitting and receiving section 15 receives as magnetic field changes a passive load modulation signal provided through passive load modulation of the transmission carrier by the transponder 20 changing the load (resistance) of the transponder 20 as viewed from the R/W 10.

A received signal obtained by the transmitting and receiving section 15 upon receipt of the passive load modulation signal is supplied to the demodulating section 16.

The demodulating section 16 demodulates the received signal from the transmitting and receiving section 15. The demodulating section 16 outputs the resulting demodulated data, i.e., the data transmitted by the transponder 20 (transmission target data).

The transponder 20 may, for example, be an IC card or a block that governs the function of the IC card in a portable terminal such as a smartphone. The transponder 20 includes a transmitting and receiving section 21, a resistor 22, a demodulating section 23, a resistor 24, and a MOSFET (Metal Oxide Semiconductor Field Effect Transistor) 25.

The transmitting and receiving section 21 includes a coil 21A acting as an antenna and a capacitor 21B, which make up a resonant circuit.

The transmitting and receiving section 21 receives as magnetic field changes the ASK-modulated signal or the transmission carrier transmitted by the R/W 10.

Also, the transmitting and receiving section 21 transmits as magnetic field changes a passive load modulation signal provided through passive load modulation of the transmission carrier from the R/W 10 by the FET 25 turning on and off the load of the transponder 20 as viewed from the R/W 10.

The demodulating section 23 demodulates the received signal obtained by the transmitting and receiving section 21 upon receipt of the ASK-modulated signal. The demodulating section 23 outputs the resulting demodulated data, i.e., the transmission target data sent from the R/W 10.

The MOSFET 25 (its gate) is supplied with the transmission target data to be transmitted from the transponder 20 to the R/W 10 at a predetermined rate of 212 kbps, for example.

The MOSFET 25 functions as a switch that turns on and off in response to the transmission target data supplied thereto. In so doing, the MOSFET 25 switches the transmitting and receiving section 21 to either the resistor 22 or to the resistors 22 and 24. This changes the load of the transponder 20 as viewed from the R/W 10, thereby subjecting the transmission carrier sent from the R/W 10 to passive load modulation in accordance with the transmission target data supplied to the MOSFET 25.

In the case where the R/W 10 transmits the transmission target data to the transponder 20 of the communication system of FIG. 1 configured as described above, the R/W 10 transmits the transmission target data by ASK-modulating the transmission carrier in accordance with the transmission target data.

In the case where the transponder 20 transmits the transmission target data to the R/W 10, the transponder 20 transmits the transmission target data by performing passive load modulation on the transmission carrier to change the load of the transponder 20 as viewed from the R/W 10 in accordance with the transmission target data.

More specifically, the R/W 10 receives the transmission target data from the transponder 20 by reading, from a signal appearing at the transmitting and receiving section 15 acting as a resonant circuit, magnetic field changes representing the load changes reflecting the transmission target data in the transponder 20.

Incidentally, as mentioned above, the miniaturization of the parts for implementing the NFC communication capability is expected so that the NFC communication will be applied to small devices such as wearable devices.

In the NFC communication, the component part that occupies a significantly large area is the antenna. Thus, the communication system of FIG. 1 requires that the coils 15A and 21A as the antenna be made smaller in size.

However, the use of passive load modulation makes it difficult to downsize the coils 15A and 21A acting as the antennas.

More specifically, in passive load modulation, magnetic fields are changed by varying the load of the transponder 20 (the load when the transponder 20 side is viewed from the R/W 10).

In a case where the coils 15A and 21A acting as the antennas are small in size or where they are far apart, the coefficient of coupling between the coils 15A and 21A is reduced. This translates into smaller magnetic field changes taking place. As a result, it becomes difficult for the R/W 10 to demodulate the passive load modulation signal obtained in accordance with the magnetic field changes.

In the communication system of FIG. 1, a coupling coefficient higher than a predetermined value is required of the coils 15A and 21A acting as the antennas in order to transmit the transmission target data by passive load modulation. The coils 15A and 21A need to be large enough to attain the required coefficient of coupling therebetween.

For that reason, in a case where the communication system FIG. 1 used in applications such as payment of fares for public transportation is required to ensure a communication distance of approximately 50 to 100 mm (i.e., distance between the R/W 10 and the transponder 20 over which the R/W 10 and the transponder 20 can communicate with each other), the coils 15A and 21A acting as the antennas need to be sufficiently large to fulfill the purpose.

In this regard, the NFC communication using passive load modulation is often rate-determined by the distance over which the transmission target data can be transmitted (received) through passive load modulation.

More specifically, even if the distance is such that the R/W 10 can transmit the transmission target data to the transponder 20 by ASK modulation, the transponder 20 may fail to transmit the transmission target data to the R/W 10 by passive load modulation.

In order to overcome that failure, there are techniques that use active load modulation instead of passive load modulation.

Active load modulation involves getting the transponder to generate and transmit a synchronizing signal synchronized with a transmission carrier coming from the R/W. This generates an active load modulation signal that combines the transmission carrier sent from the R/W with the synchronizing signal transmitted by the transponder.

The transponder turns on and off the output of the synchronizing signal in accordance with the transmission target data. This causes the active load modulation signal to become a signal (in a way) modulating the transmission carrier in accordance with the transmission target data.

In active load modulation, a current representing the synchronizing signal flows through the antenna of the transponder. This translates into large magnetic field (magnetic flux) changes taking place to make the communication performance such as communicable distance better than with passive load modulation. Thus, even if the antennas are downsized, the use of active load modulation makes it possible to maintain the communication performance as high as that of the passive load modulation before antenna miniaturization, for example.

<Active Load Modulation>

FIG. 2 is an explanatory diagram explaining an overview of active load modulation.

More specifically, FIG. 2 is a block diagram outlining a typical configuration of a communication system that performs NFC communication using active load modulation.

In FIG. 2, the communication system includes an R/W 30 and a transponder 50 and permits NFC communication between the R/W 30 and the transponder 50 using magnetic fields.

Incidentally, FIG. 2 depicts the R/W 30 being functionally divided into a transmission system 31 that transmits a transmission carrier and a reception system 32 that receives an active load modulation signal. In practice, however, the transmission system 31 and the reception system 32 may be integrally configured.

The R/W 30 includes a carrier generating section 41, capacitors 42 and 43, a coil 44, a capacitor 45, and a demodulating section 46.

The components ranging from the carrier generating section 41 to the coil 44 constitute the transmission system 31. The components ranging from the coil 44 to the demodulating section 46 make up the reception system 32.

In the transmission system 31, one end of the capacitor 42 and one end of the capacitor 43 are connected with the carrier generating section 41. The other end of the capacitor 42 is connected with one end of the coil 44, and the other end of the capacitor 43 is connected with the other end of the coil 44.

In the reception system 32, the coil 44 and the capacitor 45 constitute a parallel resonant circuit. The demodulating section 46 is connected with a connecting point between the coil 44 and the capacitor 45.

The transponder 50 includes a coil 51, a capacitor 52, a resistor 53, a synchronizing signal generating section 54, and a switch 55.

In the transponder 50, the coil 51, capacitor 52, and resistor 53 are parallelly connected with each other. The synchronizing signal generating section 54 and the switch 55 are connected in series with a circuit in which the components ranging from the coil 51 to the resistor 53 are parallelly connected with each other.

In a case where the transmission target data is transmitted from the transponder 50 to the R/W 30 through active load modulation, the carrier generating section 41 in the transmission system 31 of the R/W 30 generates the transmission carrier with a frequency of 13.56 MHz, for example. The transmission carrier generated by the carrier generating section 41 is then transmitted as magnetic field changes by the coil 44 acting as the antenna via the capacitors 42 and 43.

The transmission carrier transmitted by the coil 44 is received by the coil 51 acting as the antenna in the transponder 50. The resulting received signal is supplied to the synchronizing signal generating section 54 from the resonant circuit including the coil 51 and the capacitor 52.

The synchronizing signal generating section 54 generates a synchronizing signal synchronized with the received signal (also synchronized with the transmission carrier) from the resonant circuit including the coil 51 and the capacitor 52.

Also in the transponder 50, the switch 55 turns on and off in accordance with the transmission target data at a rate of 212 kbps, for example. This turns on and off the output of the synchronizing signal generated by the synchronizing signal generating section 54.

During the period in which the switch 55 is turned on, the synchronizing signal is output via the resistor 53 to the resonant circuit that includes the coil 51 and the capacitor 52. The coil 51 acting as the antenna transmits the synchronizing signal in the form of magnetic field changes.

Transmission of the synchronizing signal by the transponder 50 causes the synchronizing signal sent from the transponder 50 to be combined with the transmission carrier sent from the R/W 30. Combining the transmission carrier with the synchronizing signal provides an active load modulation signal.

In the transponder 50, the output of the synchronizing signal is turned on and off in accordance with the transmission target data as described above. The active load modulation signal thus turns out to be a signal obtained by modulating the transmission carrier in accordance with the transmission target data.

The active load modulation signal is received by the coil 44 acting as the antenna in the reception system 32 of the R/W 30. The received signal obtained by the coil 44 upon receipt of the active load modulation signal is supplied to the demodulating section 46 from the resonant circuit including the coil 44 and the capacitor 45.

The demodulating section 46 demodulates the received signal from the resonant circuit including the coil 44 and the capacitor 45. The demodulating section 46 outputs the resulting demodulated data, i.e., the transmission target data sent from the transponder 50.

Figure 3:
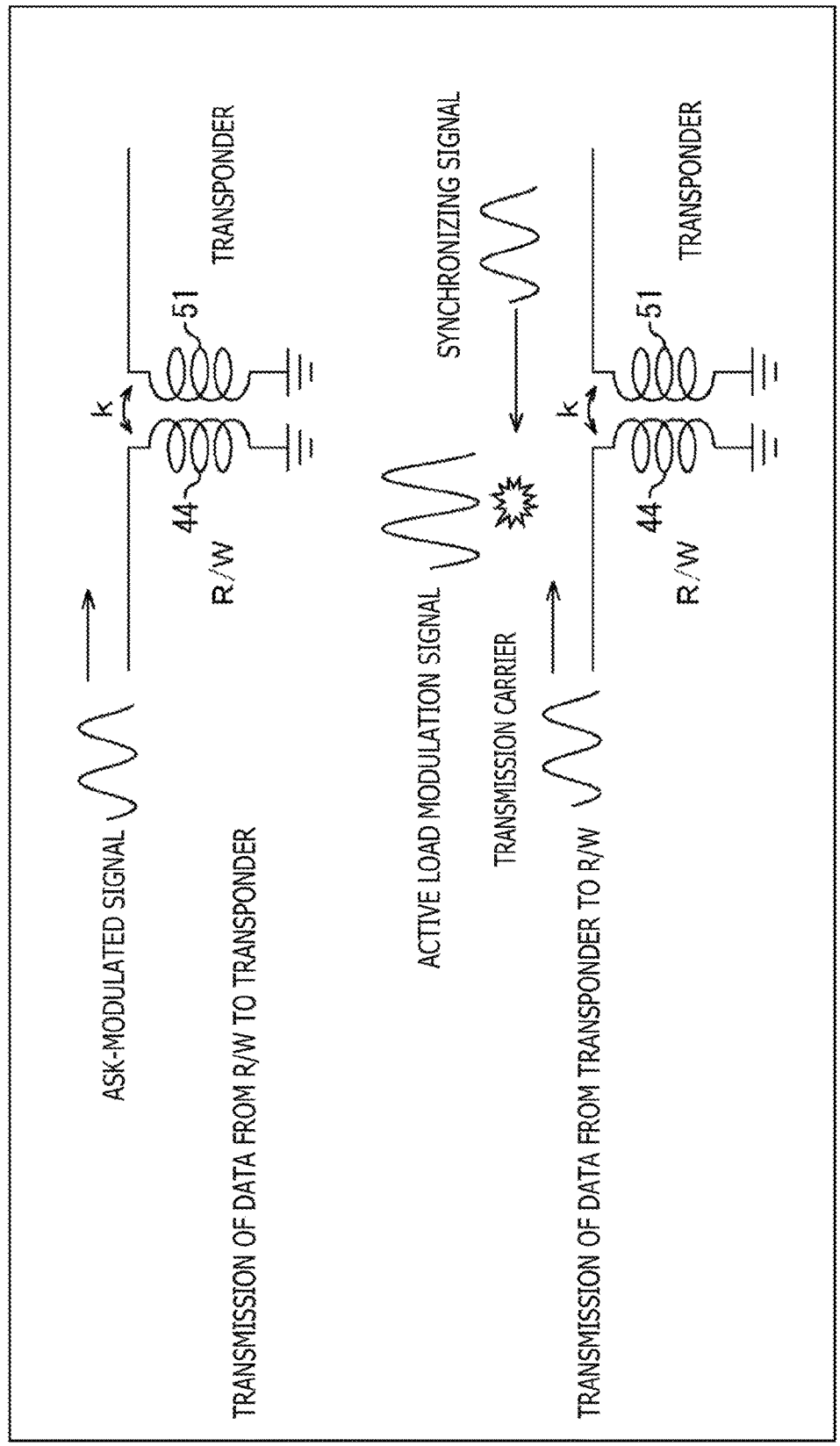
FIG. 3 is a schematic diagram depicting how transmission target data is transmitted by a communication system that performs NFC communication using active load modulation.

FIG. 3 is a schematic diagram depicting an overview of how transmission target data is transmitted by the communication system of FIG. 2 that performs NFC communication using active load modulation.

In a case where the transmission target data is transmitted by the R/W 30 to the transponder 50, the R/W 30 transmits to the transponder 50 an ASK-modulated signal obtained by performing ASK modulation on the transmission target data with a predetermined coupling coefficient k established between the coils 44 and 51 acting as the antennas.

On the other hand, in a case where the transponder 50 transmits the transmission target data to the R/W 30, the transponder 50 generates a synchronizing signal synchronized with a received signal obtained upon receipt of the transmission carrier from the R/W 30.

Furthermore, in the transponder 50, with the predetermined coupling coefficient k established between the coils 44 and 51 acting as the antennas, the transponder 50 transmits to the R/W 30 the synchronizing signal of which the output is turned on and off in accordance with the transmission target data.

Incidentally, in the case where the transponder 50 turns off the output of the synchronizing signal, the synchronizing signal is not transmitted but, as a matter of convenience, is assumed to be transmitted with zero amplitude.

Transmission of the synchronizing signal by the transponder 50 causes the synchronizing signal sent from the transponder 50 to be combined with the transmission carrier sent from the R/W 30. Combining the transmission carrier with the synchronizing signal provides an active load modulation signal in which the transmission carrier is actively modulated with load in accordance with the transmission target data of the transponder 50. That is, an active load modulation signal of which the amplitude varies with the transmission target data of the transponder 50 is obtained.

As described above, in active load modulation, the transmission carrier transmitted by the R/W 30 is combined with the synchronizing signal sent from the transponder 50.

If it is assumed here that the reference character t stands for time and w for angular frequency, the sine wave acting as the transmission carrier is expressed as A sin(wt), and the sine wave acting as the synchronizing signal is given as B sin(wt+THETA). The reference character A denotes the amplitude of the transmission carrier A sin(wt) and B represents the amplitude of the synchronizing signal B sin(wt+THETA). THETA stands for the phase (shift) of the synchronizing signal B sin(wt+THETA) in reference to the phase of the transmission carrier A sin(wt).

An active load modulation signal ALMS obtained by combining the transmission carrier A sin(wt) with the synchronizing signal B sin(wt+THETA) is expressed by the following expression (1) based on the theorem of sine wave composition:

$$ALMS = A\sin(wt) + B\sin(wt + THETA) \quad (1)$$
$$= \sqrt{(A^2 + B^2 + 2AB\cos(THETA))}\sin(THETA + PHI)$$

In the expression (1) above, PHI stands for a predetermined phase.

According to the expression (1), in a case where the formula $\sqrt{(A^2+B^2+2AB\cos(THETA))}$=A holds, i.e., where the formula cos(THETA)=−B/2A, or B=−2A cos(THETA) holds, whether the output of the synchronizing signal is on (B<>0) or off (B=0), there occurs an amplitude NULL with a modulation degree of 0%, i.e., the amplitude of the active load modulation signal ALMS being the same as the amplitude A of the transmission carrier.

As described above, active load modulation entails generation of the amplitude NULL in the case where the amplitude A of the transmission carrier, the amplitude B of the synchronizing signal, and the phase THETA of the synchronizing signal have the relations therebetween defined by the expression cos(THETA)=−B/2A. The amplitude NULL disables the transponder 50 from transmitting the transmission target data to the R/W 30 (i.e., the R/W 30 is incapable of demodulating the active load modulation signal ALMS into transmission target data).

The modulation degree of the active load modulation signal ALMS affects the communication performance of NFC communication using active load modulation. According to the expression (1), the modulation degree varies with the amplitude A of the transmission carrier, with the amplitude B of the synchronizing signal, and with the phase THETA of the synchronizing signal.

As described above, the communication performance of NFC communication using active load modulation is affected by the amplitude A of the transmission carrier, by the amplitude B of the synchronizing signal, and by the phase THETA of the synchronizing signal.

Figure 4:
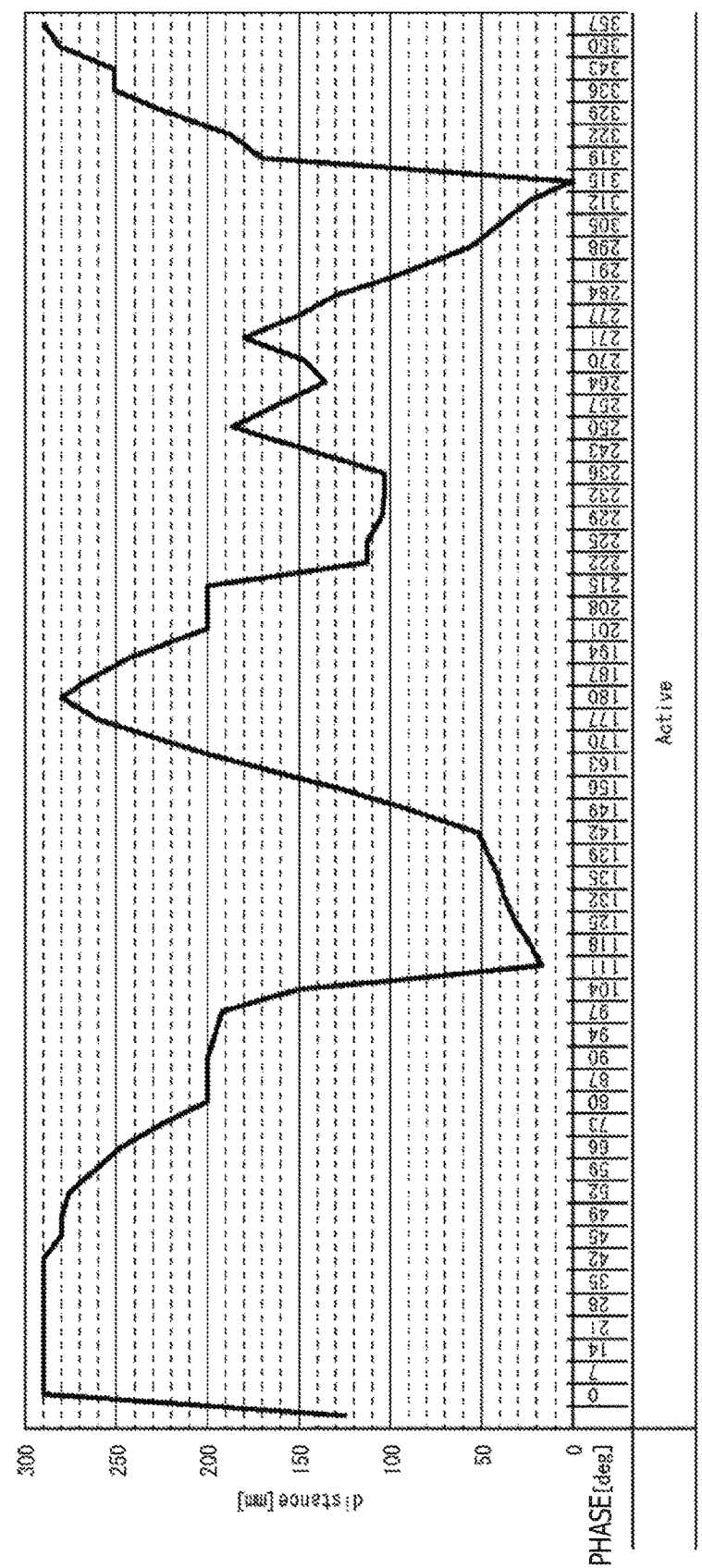
FIG. 4 is a graphic representation depicting the results of simulations performed on the communication performance of NFC communication using active load modulation.

FIG. 4 is a graphic representation depicting the results of simulations performed on the communication performance of NFC communication using active load modulation.

In FIG. 4, the horizontal axis represents the phase THETA of the synchronizing signal and the vertical axis denotes the communication distance of NFC communication using active load modulation (i.e., distance over which communication can be performed through active load modulation).

From FIG. 4, it can be seen that the phase THETA of the synchronizing signal significantly affects the communication distance representative of the communication performance.

In active load modulation, the modulation degree varies with the phase THETA of the synchronizing signal. In a worst-case scenario, the modulation degree may become 0% (amplitude NULL).

In active load modulation, as described above, the modulation degree varies with the phase THETA. That means the communication distance representative of the communication performance varies with the phase THETA as well.

Figure 5:
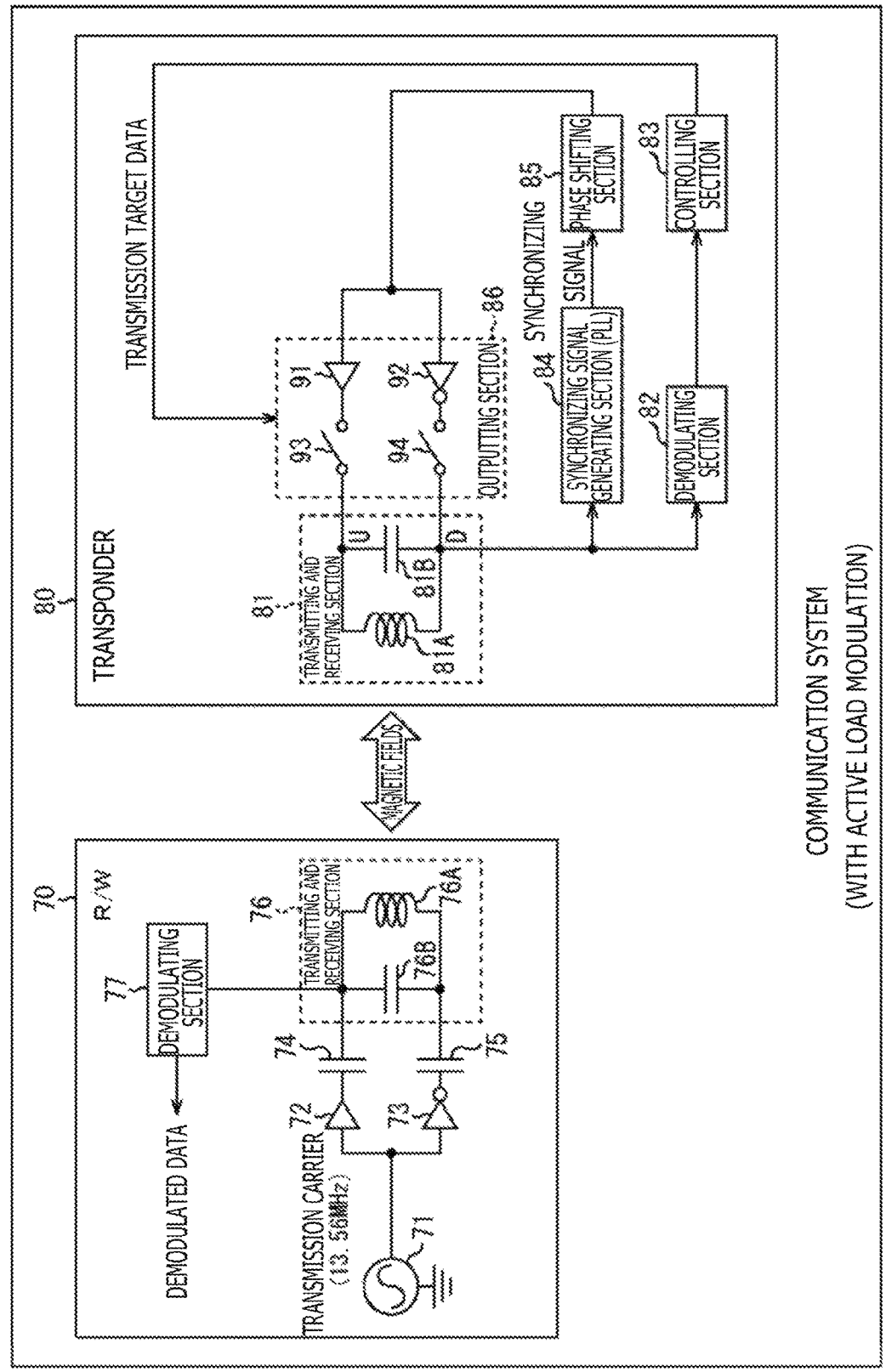
FIG. 5 is a block diagram depicting a typical configuration of a communication system that performs NFC communication using active load modulation.

FIG. 5 is a block diagram depicting a typical configuration of a communication system that performs NFC communication using active load modulation.

In FIG. 5, the communication system includes an R/W 70 and a transponder 80 and permits NFC communication between the R/W 70 and the transponder 80 using magnetic fields.

Incidentally, FIG. 5 depicts only those parts necessary for the transponder 80 to transmit transmission target data to the R/W 70 through active load modulation. The drawing omits the blocks needed for the R/W 70 to transmit transmission target data to the transponder 80 through ASK modulation.

The R/W 70 includes a carrier generating section 71, buffers 72 and 73, capacitors 74 and 75, a transmitting and receiving section 76, and a demodulating section 77.

The carrier generating section 71 generates as a transmission carrier a sine wave with a predetermined frequency of 13.56 MHz, for example, and supplies the generated transmission carrier to the buffers 72 and 73.

The buffer 72 buffers the transmission carrier coming from the carrier generating section 71, and supplies the buffered transmission carrier to the transmitting and receiving section 76 via the capacitor 74.

The buffer 73 buffers and inverts the transmission carrier coming from the carrier generating section 71, and supplies the inverted transmission carrier to the transmitting and receiving section 76 via the capacitor 75.

The transmitting and receiving section 76 includes a coil 76A acting as an antenna and a capacitor 76B, which make up a parallel resonant circuit. The transmission carrier coming from the buffer 72 is supplied to a connecting point that connects one end of the coil 76A with one end of the capacitor 76B. The transmission carrier from the buffer 73 is supplied to a connecting point that connects the other end of the coil 76A with the other end of the capacitor 76B.

The transmitting and receiving section 76 converts the transmission carriers from the buffers 72 and 73 into magnetic field changes, and transmits the resulting magnetic field changes.

Also, the transmitting and receiving section 76 receives as magnetic field changes an active load modulation signal (in which the transmission carrier is modulated with a synchronizing signal) transmitted by the transponder 80.

A received signal obtained by the transmitting and receiving section 76 upon receipt of the active load modulation signal is supplied to the demodulating section 77 through the connecting point connecting one end of the coil 76A with one end of the capacitor 76B.

The demodulating section 77 demodulates the received signal from the transmitting and receiving section 76 to obtain demodulated data. The demodulating section 77 outputs the resulting demodulated data, i.e., the transmission target data sent from the transponder 80.

The transponder 80 may, for example, be an IC card or a block that governs the function of the IC card in a portable terminal such as a smartphone. The transponder 80 includes a transmitting and receiving section 81, a demodulating section 82, a controlling section 83, a synchronizing signal generating section 84, a phase shifting section 85, and an outputting section 86.

The transmitting and receiving section 81 include a coil 81A acting as an antenna and a capacitor 81B, which make up a parallel resonant circuit. One end of the coil 81A is connected with one end of the capacitor 81B at a connecting point U. The other end of the coil 81A is connected with the other end of the capacitor 81B at a connecting point D.

The transmitting and receiving section 81 receive as magnetic field changes the transmission carrier or the ASK-modulated signal sent from the R/W 70 to obtain a received signal. The transmitting and receiving section 81 supplies the resulting received signal to the demodulating section 82 and to the synchronizing signal generating section 84.

Also, the transmitting and receiving section 81 converts the synchronizing signal output by the outputting section 86 into magnetic field changes, and transmits the resulting magnetic field changes.

Whereas the transmitting and receiving section 81 constitutes the parallel resonant circuit in which the coil 81A and the capacitor 81B are connected in parallel with each other, the transmitting and receiving section 81 may alternatively use a series resonant circuit. As other alternatives, the transmitting and receiving section 81 may be configured to use both a parallel resonant circuit and a series resonant circuit, may be configured to be something other than a resonant circuit such as the coil 81A alone, or may be configured otherwise to transmit and receive signals to and from the R/W 70 by electromagnetic induction, for example.

The demodulating section 82 demodulates the received signal from the transmitting and receiving section 81 (i.e., received signal obtained upon receipt of the ASK-modulated signal from the R/W 70) to obtain demodulated data. The demodulating section 82 supplies the resulting demodulated data (i.e., transmission target data sent from the R/W 70) to the controlling section 83.

The controlling section 83 performs predetermined processes in accordance with the demodulated data coming from the demodulating section 82.

Also, in accordance with the transmission target data to be transmitted to the R/W 70, the controlling section 83 controls the outputting section 86 to turn on and off the output of the synchronizing signal from the outputting section 86 to the transmitting and receiving section 81.

The synchronizing signal generating section 84 includes a PLL (Phase Lock Loop), for example. The synchronizing signal generating section 84 generates a synchronizing signal synchronized with the received signal from the transmitting and receiving section 81, i.e., the synchronizing signal synchronized with the transmission carrier. The synchronizing signal generating section 84 supplies the generated synchronizing signal to the phase shifting section 85.

The phase shifting section 85 shifts the phase of the synchronizing signal coming from the synchronizing signal generating section 84 by a predetermined amount of phase shift, and supplies the phase-shifted synchronizing signal to the outputting section 86.

Under control of the controlling section 83, the outputting section 86 outputs the synchronizing signal coming from the phase shifting section 85 to the transmitting and receiving section 81 in accordance with the transmission target data.

The outputting section 86 includes buffers 91 and 92 and switches 93 and 94.

The buffer 91 buffers the synchronizing signal from the phase shifting section 85, and outputs the buffered synchronizing signal to the transmitting and receiving section 81 (i.e., to its connecting point U) via the switch 93.

The buffer 92 buffers and inverts the synchronizing signal from the phase shifting section 85, and outputs the inverted synchronizing signal to the transmitting and receiving section 81 (i.e., to its connecting point D) via the switch 94. Incidentally, the buffers 91 and 92 are capable of amplifying the synchronizing signal from the phase shifting section 85 with a predetermined gain, the amplification factor being one or larger.

Under control of the controlling section 83, the switches 93 and 94 turn on and off in accordance with the transmission target data in order to output the synchronizing signal from the phase shifting section 85 to the transmitting and receiving section 81.

In a case where the transponder 80 transmits the transmission target data to the R/W 70 in the communication system configured as described above, the R/W 70 causes the carrier generating section 71 to generate the transmission carrier and the transmitting and receiving section 76 to convert the transmission carrier into magnetic field changes via the buffers 72 and 73 as well as the capacitors 74 and 75, before transmitting the resulting magnetic field changes.

In the transponder 80, the transmitting and receiving section 81 receives the transmission carrier from the R/W 70 to obtain a received signal. The transmitting and receiving section 81 supplies the received signal to the synchronizing signal generating section 84.

The synchronizing signal generating section 84 generates a synchronizing signal synchronized with the received signal from the transmitting and receiving section 81, and supplies the generated synchronizing signal to the phase shifting section 85.

The phase shifting section 85 shifts by a predetermined amount the phase of the synchronizing signal by, for example, delaying the synchronizing signal supplied from the synchronizing signal generating section 84. The phase shifting section 85 supplies the phase-shifted synchronizing signal to the outputting section 86.

Under control of the controlling section 83, the outputting section 86 turns on and off the output of the synchronizing signal from the phase shifting section 85 to the transmitting and receiving section 81 in accordance with the transmission target data.

The transmitting and receiving section 81 converts the synchronizing signal output by the outputting section 86 into magnetic field changes, and transmits the resulting magnetic field changes.

Transmission of the synchronizing signal by the transmitting and receiving section 81 in the transponder 80 causes the synchronizing signal sent from the transponder 80 to be combined with the transmission carrier sent from the transmitting and receiving section 76 in the R/W 70. Combining the transmission carrier with the synchronizing signal provides an active load modulation signal in which the transmission carrier is actively modulated with load in accordance with the transmission target data of the transponder 80. That is, an active load modulation signal of which the amplitude varies with the transmission target data of the transponder 80 is generated.

The active load modulation signal is received by the transmitting and receiving section 76 of the R/W 70. The received signal obtained upon receipt of the active load modulation signal is supplied from the transmitting and receiving section 76 to the demodulating section 77.

The demodulating section 77 demodulates the received signal coming from the transmitting and receiving section 76 to obtain demodulated data. The demodulating section 77 outputs the resulting demodulated data (i.e., transmission target data sent from the transponder 80).

It is to be noted here that the synchronizing signal generated by the synchronizing signal generating section 84 in the transponder 80 is synchronized with the received signal obtained by the transmitting and receiving section 81 upon receipt of the transmission carrier.

The transmission carrier generated by the carrier generating section 71 in the R/W 70 passes through the resonant circuits including the transmitting and receiving sections 76 and 81 to become the received signal. While passing through these components, the transmission carrier, and eventually the received signal, has its phase shifted.

The phase THETA of the synchronizing signal B sin(wt+THETA) referenced to the phase of the transmission carrier A sin(wt) in the expression (1) above occurs in a case where the transmission carrier A sin(wt) passes through the resonant circuits including the transmitting and receiving sections 76 and 81.

For example, in a case where the transmission carrier is a sine wave with a frequency of 13.56 MHz and where the Q value of the resonant circuits is 12, the transmission carrier has its phase shifted by approximately 90 degrees upon passing through the resonant circuits.

As explained above with reference to FIG. 4, the phase THETA of the synchronizing signal B sin(wt+THETA) significantly affects the communication performance of NFC communication using active load modulation.

In view of this, the phase shifting section 85 shifts the phase THETA of the synchronizing signal B sin(wt+THETA) by a predetermined amount of phase shift so as to improve the communication performance.

The amount of phase shift to be made by the phase shifting section 85 is determined in such a manner that the communication performance will be improved with regard to the phase THETA of the phase-shifted synchronizing signal B sin(wt+THETA).

However, the phase THETA of the synchronizing signal generated by the synchronizing signal generating section 84 and synchronized with the received signal varies, for example, with variations in such parts as the coil 81A and capacitor 81B included in the transmitting and receiving section 81 that acquires the received signal.

More specifically, the phase of the synchronizing signal obtained by the transponder 80 varies from one individual transponder to another depending on the variations in their parts.

For that reason, even if it is possible to obtain the amount of phase shift to be made by the phase shifting section 85 to attain the suitable phase of the synchronizing signal that ensures suitable communication performance required by design (that phase will be called the suitable phase hereunder), and eventually even if it is possible to obtain the suitable phase of the synchronizing signal (the amount of phase shift will be called the suitable amount hereunder), variations in the phase of the synchronizing signal yet to be shifted by the suitable amount can prevent the phase THETA of the synchronizing signal phase-shifted by the suitable amount from attaining the suitable phase. This can deteriorate the communication performance.

FIG. 6 is a tabular diagram depicting the results of simulations performed using a given R/W-A as the R/W 70.

More specifically, FIG. 6 depicts the results of simulations of the relations between communication performance on the one hand, and the resonance frequency of the resonant circuit as the transmitting and receiving section 81 and the phase THETA of the phase-shifted synchronizing signal output by the phase shifting section 85 on the other hand.

In FIG. 6, circles denote cases in which the communication distance with active load modulation is better than with passive load modulation, and triangles represent cases where the communication distance with active load modulation is no better than with passive load modulation.

According to FIG. 6, in a case where the resonance frequency of the resonant circuit as the transmitting and receiving section 81 is 13.56 MHz, i.e., equal to the frequency of the transmission carrier, the communication performance with active load modulation is better than with passive load modulation provided that the phase THETA is in a range of approximately 15 to 120 degrees.

Also, in a case where the resonance frequency of the resonant circuit as the transmitting and receiving section 81 is 13.31 MHz, i.e., shifted by −250 kHz from the frequency of 13.56 MHz of the transmission carrier, the communication performance with active load modulation is better than with passive load modulation provided that the phase THETA is in a range of approximately 0 to 105 degrees.

Furthermore, in a case where the resonance frequency of the resonant circuit as the transmitting and receiving section 81 is 13.81 MHz, i.e., shifted by +250 kHz from the frequency of 13.56 MHz of the transmission carrier, the communication performance with active load modulation is better than with passive load modulation provided that the phase THETA is in a range of approximately 45 to 150 degrees.

From FIG. 6, it can be seen that with active load modulation, if the resonance frequency of the resonant circuit as the transmitting and receiving section 81 is shifted by approximately 250 kHz from the design-value frequency of 13.56 MHz of the transmission carrier, the phase THETA of the synchronizing signal that achieves better communication performance than with passive load modulation is shifted by approximately 15 to 30 degrees.

That is, it can be seen that if the resonance frequency of the resonant circuit as the transmitting and receiving section 81 is shifted by approximately 250 kHz from the frequency of 13.56 MHz of the transmission carrier, the phase of the received signal obtained by the transmitting and receiving section 81 upon receipt of the transmission carrier is shifted by approximately 15 to 30 degrees from the normal value (i.e., design value applicable with no variations in resonance frequency).

As described above, in the case where the resonance frequency of the resonant circuit as the transmitting and receiving section 81 is shifted in phase due to variations in parts, the phase of the received signal and eventually of the synchronizing signal generated from and synchronized with the received signal is shifted from the normal value (design value applicable with no variations in parts).

For that reason, even if the phase of the synchronizing signal is shifted by the suitable amount, the phase THETA of the synchronizing signal shifted by the suitable amount fails to attain the suitable phase, since the yet-to-be-shifted phase of the synchronizing signal was already shifted from the normal value. This can lead to deterioration of the communication performance.

The shifted phase of the synchronizing signal (received signal) and eventually the deterioration of the communication performance attributable to variations in parts can be brought about not only by variations in the parts of the resonant circuit as the transmitting and receiving section 81 but also by variations in the coils and capacitors used in filters for harmonic removal, not depicted, by variable delays due to variations in PLL parts included in the synchronizing signal generating section 84, or by variable delays caused by variations in parts included in the outputting section 86.

One typical way of improving the above-mentioned deterioration of the communication performance due to variations in parts is by manually adjusting the amount of phase shift to be made by the phase shifting section 85 in such a manner that the phase of the synchronizing signal shifted by the phase shifting section 85 will attain the suitable phase.

However, it is not easy to manually adjust the amount of phase shift to be carried out by the phase shifting section 85 on each apparatus.

Also, another typical way of improving the deterioration of the communication performance attributable to variations in parts is a method of adjusting a variable capacitor by equipping the transmitting and receiving section 81 included is the resonant circuit with an external variable capacitor for adjusting the resonance frequency in such a manner that the phase of the synchronizing signal shifted by the suitable amount by the phase shifting section 85 will attain the suitable phase, i.e., that the resonance frequency of the resonant circuit as the transmitting and receiving section 81 will reach the design value of 13.56 MHz, as described in the above-cited PTL 1.

However, the variable capacitor has a wide area and costs significantly. Mounting the variable capacitor will make the transponder 80 larger in size and higher in cost.

In view of the above, the present technology is aimed at improving the deterioration of the communication performance due to variations in parts, for example, while minimizing increases in size and cost.

<Embodiment of the Communication System to Which the Present Technology is Applied>

Figure 7:
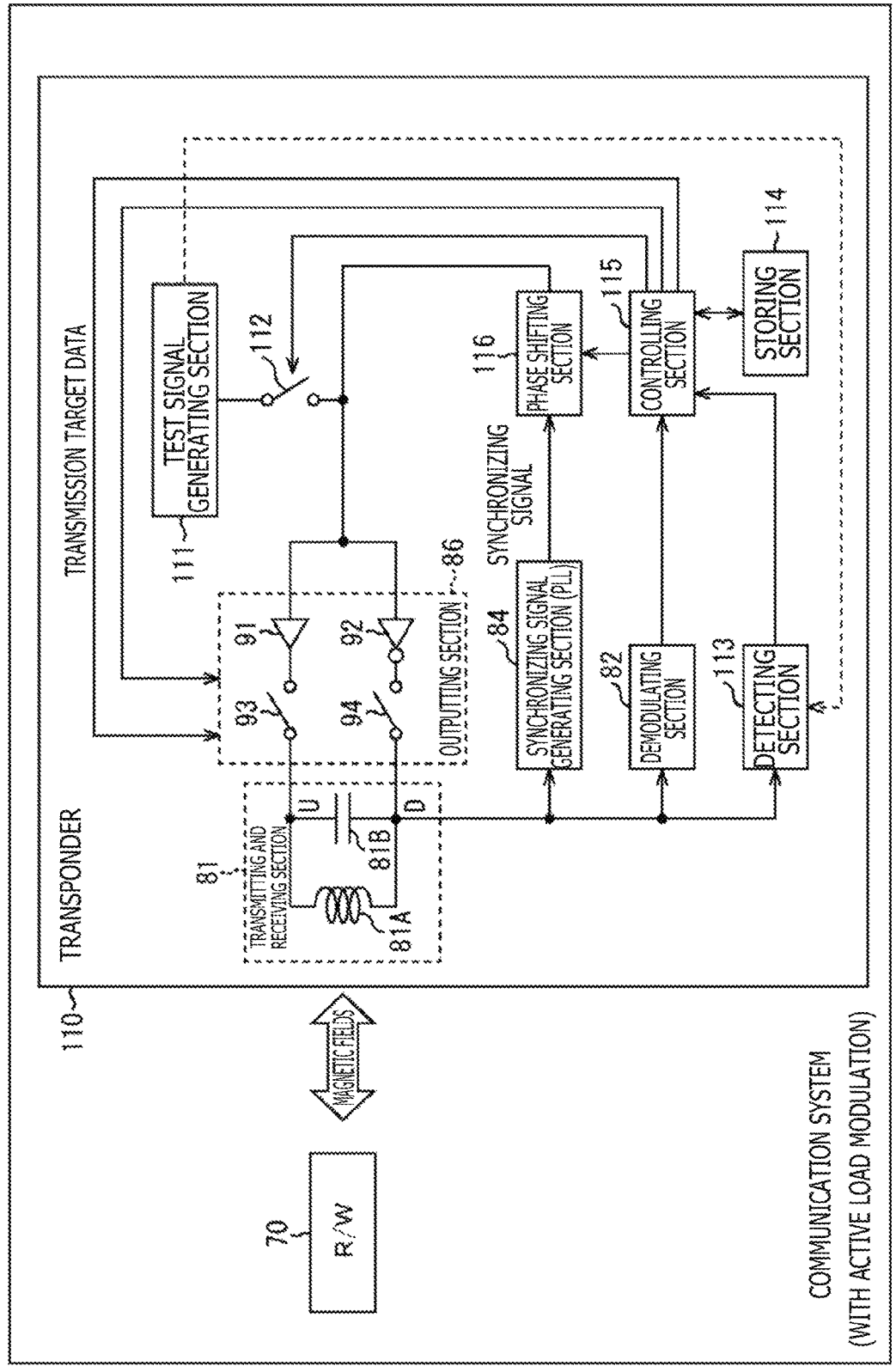
FIG. 7 is a block diagram depicting a typical configuration of one embodiment of a communication system to which the present technology is applied.

FIG. 7 is a block diagram depicting a typical configuration of one embodiment of a communication system to which the present technology is applied.

In FIG. 7, the parts corresponding to those in FIG. 5 are designated by the same reference numerals, and their explanations will be omitted hereunder where appropriate.

In FIG. 7, the communication system includes the R/W 70 and a transponder 110.

The communication system in FIG. 7 is therefore similar to the configuration in FIG. 5 in that the communication system has the R/W 70, and is different from the configuration in FIG. 5 in that the communication system has the transponder 110 instead of the transponder 80.

The communication system in FIG. 7 conducts NFC communication between the R/W 70 and the transponder 110 using magnetic fields.

Transmission target data is sent from the R/W 70 to the transponder 110 through ASK modulation and from the transponder 110 to the R/W 70 through active load modulation.

The transponder 110 may, for example, be an IC card or a block that governs the function of the IC card in a portable terminal such as a smartphone. The transponder 110 includes a transmitting and receiving section 81, a demodulating section 82, a synchronizing signal generating section 84, an outputting section 86, a test signal generating section 111, a switch 112, a detecting section 113, a storing section 114, a controlling section 115, and a phase shifting section 116.

The transponder 110 is therefore similar to the transponder 80 in FIG. 5 in that the transponder 110 has the transmitting and receiving section 81, demodulating section 82, synchronizing signal generating section 84, and outputting section 86.

However, the transponder 110 is different from the transponder 80 in FIG. 5 in that the transponder 110 has the controlling section 115 and the phase shifting section 116 in place of the controlling section 83 and the phase shifting section 85, respectively. Furthermore, the transponder 110 is different from the transponder 80 in FIG. 5 in that the transponder 110 newly includes the test signal generating section 111, switch 112, detecting section 113, and storing section 114.

The test signal generating section 111 generates and outputs a predetermined signal as the test signal.

Typically used as the test signal may be a signal with the frequency of the transmission carrier (13.56 MHz for this embodiment) or a signal with some other fixed frequency. Also, a signal with sweeping frequencies over a predetermined range may be used as the test signal. As another alternative, an appropriate alternating-current signal may be used as the test signal.

The switch 112 is turned on and off under control of the controlling section 115. BY turning on the switch 112, the switch 112 supplies the outputting section 86 with the test signal output by the test signal generating section 111.

Incidentally, the transponder 110 has two operation modes, e.g., normal mode in which the transponder 110 communicates with the R/W 70, and test mode in which the transponder 110 calibrates an active load modulation signal.

The transponder 110 may be switched from one operation mode to another typically by a predetermined operation. For example, at the factory where the transponder 110 is manufactured, the operation mode of the transponder 110 is set to test mode when the transponder 110 is checked. Otherwise, the operation mode of the transponder 110 is set to normal mode.

When the operation mode of the transponder 110 is set to test mode, the switch 112 is turned on. When the operation mode of the transponder 110 is set to normal mode, the switch 112 is turned off.

Thus, when the operation mode is test mode, the test signal output by the test signal generating section 111 is output (supplied) to the outputting section 86. From the outputting section 86, the test signal is further output to the transmitting and receiving section 81.

The transmitting and receiving section 81 receives the test signal from the outputting section 86.

In the transmitting and receiving section 81, one end of the coil 81A is connected with one end of the capacitor 81B at a connecting point U, and the other end of the coil 81A is connected with the other end of the capacitor 81B at a connecting point D, for example. The transmitting and receiving section 81 acts as a parallel resonant circuit.

The connecting point D of the transmitting and receiving section 81 is connected with the demodulating section 82, with the synchronizing signal generating section 84, and with the detecting section 113. A received test signal obtained by the transmitting and receiving section 81 upon receipt of the test signal is output from the connecting point D to the detecting section 113 (as well as to the demodulating section 82 and to the synchronizing signal generating section 84).

When the operation mode is normal mode, the outputting section 86 is supplied with a synchronizing signal output by the phase shifting section 116, to be discussed later. The outputting section 86 outputs the synchronizing signal coming from the phase shifting section 116 to the transmitting and receiving section 81.

The transmitting and receiving section 81 converts the synchronizing signal from the outputting section 86 into magnetic field changes, and transmits the resulting magnetic field changes (to the R/W 70).

Furthermore, when the operation mode is normal mode, the transmitting and receiving section 81 receives as magnetic field changes a transmission carrier or an ASK-modulated signal sent from the R/W 70. The received signal obtained by the transmitting and receiving section 81 upon receipt of the transmission carrier or the ASK-modulated signal from the R/W 70 is output from the connecting point D to the demodulating section 82 and to the synchronizing signal generating section 84 (as well as to the detecting section 113).

From the received test signal output from the connecting point D of the transmitting and receiving section 81, the detecting section 113 detects, using as needed the test signal generated by the test signal generating section 111, influence parameters that affect the intensity of the active load modulation signal obtained by combining the transmission carrier sent from the R/W 70 with the synchronizing signal transmitted by the transmitting and receiving section 81.

More specifically, the detecting section 113 detects at least one of the influence parameters such as the current (its amplitude) of the received test signal, the voltage (its amplitude) of the received test signal, and a phase difference (of voltage or current) between the received test signal and the test signal.

The detecting section 113 supplies the controlling section 115 with the influence parameters detected from the received test signal.

Under control of the controlling section 115, for example, the storing section 114 stores control parameters for controlling the intensity of the active load modulation signal.

As with the controlling section 83 in FIG. 5, the controlling section 115 performs predetermined processes in accordance with demodulated data supplied from the demodulating section 82, and controls the outputting section 86 (its switches 93 and 94) in keeping with the transmission target data to be sent to the R/W 70 to turn on and off the output of the synchronizing signal from the outputting section 86 to the transmitting and receiving section 81.

Furthermore, in accordance with the influence parameters supplied from the detecting section 113, the controlling section 115 controls the intensity of the active load modulation signal.

More specifically, in accordance with the influence parameters from the detecting section 113, the controlling section 115 calculates the control parameters for controlling the intensity of the active load modulation signal, and updates the control parameters stored in the storing section 114 with the calculated control parameters.

Furthermore, the controlling section 115 controls the intensity of the active load modulation signal in accordance with the control parameters stored in the storing section 114.

In this case, the intensity of the active load modulation signal ALMS defined by the expression (1) above is controlled using the amplitude of the active load modulation signal ALMS defined as $\sqrt{(A^2+B^2+2AB\cos(THETA))}$ for the control.

With regard to the amplitude of the active load modulation signal ALMS signal defined as $\sqrt{(A^2+B^2+2AB\cos(THETA))}$, the factors that can be controlled by the transponder 110 are the amplitude B of the synchronizing signal $B\sin(wt+THETA)$ and the phase THETA.

In view of the above, information regarding the amplitude B of the synchronizing signal $B\sin(wt+THETA)$ and the phase THETA may be used as the control parameters. In keeping with these control parameters, the controlling section 115 adjusts the amplitude B and phase THETA of the synchronizing signal $B\sin(wt+THETA)$ to control the intensity of the active load modulation signal ALMS defined by the expression (1).

More specifically, the controlling section 115 may control, for example, the phase shifting section 116 to adjust the amount of phase shift by which the phase shifting section 116 shifts the phase THETA of the synchronizing signal $B\sin(wt+THETA)$. By thus adjusting the amount of phase shift for the phase shifting section 116, the phase THETA of the synchronizing signal $B\sin(wt+THETA)$ transmitted by the transmitting and receiving section 81 is adjusted accordingly.

Also, the controlling section 115 may, for example, control the outputting section 86 to adjust the gain (in voltage) of the outputting section 86. By adjusting the gain of the outputting section 86, the voltage serving as the synchronizing signal output by the outputting section 86 to the transmitting and receiving section 81 is adjusted, and so is the current flowing through the resonant circuit as the transmitting and receiving section 81. As a result, the amplitude B of the synchronizing signal $B\sin(wt+THETA)$ transmitted by the transmitting and receiving section 81 is adjusted.

Otherwise, the controlling section 115 may, for example, control the outputting section 86 to adjust its output impedance. By thus adjusting the output impedance of the outputting section 86, the current serving as the synchronizing signal output by the outputting section 86 to the transmitting and receiving section 81 is adjusted, and so is the current flowing through the resonant circuit as the transmitting and receiving section 81. As a result, the amplitude B of the synchronizing signal $B\sin(wt+THETA)$ transmitted by the transmitting and receiving section 81 is adjusted.

The gain of the outputting section 86 may be adjusted here by varying the power supply voltage for operating the outputting section 86, for example. The power may be generated from the transmission carrier or the ASK-modulated signal sent from the R/W 70 or may be acquired from an internal battery, not depicted, installed in the transponder 110.

Also, the output impedance of the outputting section 86 may be adjusted, for example, by having each of the switches 93 and 94 configured with multiple MOSFETs connected in parallel and by changing the number of MOSFETs to be turned on.

Furthermore, the intensity of the active load modulation signal may be controlled by adjusting the amount of phase shift for the phase shifting section 116, by adjusting the gain of the outputting section 86, or by adjusting the output impedance of the outputting section 86; or by taking at least two of such measures as adjusting the amount of phase shift for the phase shifting section 116, adjusting the gain of the outputting section 86, and adjusting the output impedance of the outputting section 86.

As with the phase shifting section 85 in FIG. 5, for example, the phase shifting section 116 shifts by a predetermined amount the phase of the synchronizing signal fed from the synchronizing signal generating section 84, before supplying the phase-shifted synchronizing signal to the outputting section 86.

It is to be noted that the phase shifting section 116 adjusts (sets) the predetermined amount of phase shift by which to shift the phase of the synchronizing signal under control of the controlling section 115.

Incidentally in FIG. 7, whereas the test signal output by the test signal generating section 111 is supplied to downstream of the phase shifting section 116 (i.e., between the phase shifting section 116 and the outputting section 86), the test signal may also be supplied to upstream or downstream of the synchronizing section 84, for example.

Also in FIG. 7, the detecting section 113 located downstream of the synchronizing signal generating section 34 detects the influence parameters affecting the intensity of the active load modulation signal from the received test signal (i.e., from the synchronizing signal synchronized with the received test signal) output by the synchronizing signal generating section 84.

In that case, the phase difference between the received test signal and the test signal, for example, may be detected as an influence parameter including the effect of the delay caused by the synchronizing signal generating section 84.

Further in FIG. 7, the detecting section 113 connected with the connecting point D of the transmitting and receiving section 81 is supplied via the connecting point D with the received test signal obtained by the transmitting and receiving section 81 upon receipt of the test signal. The detecting section 113 may also be connected with the connecting point U of the transmitting and receiving section 81. In this case, the received test signal obtained by the transmitting and receiving section 81 upon receipt of the test signal is supplied to the detecting section 113 via the connecting point U.

Also in FIG. 7, the detecting section 113 may be formed integrally with the demodulating section 82.

With the communication system of FIG. 7 configured as described above and in a case where the operation mode of the transponder 110 is normal mode and where the transmission target data is to be sent from the R/W 70 to the transponder 110, the R/W 70 transmits the ASK-modulated signal obtained by modulating the transmission carrier in accordance with the transmission target data.

In the transponder 110, the transmitting and receiving section 81 supplies the ASK-modulated signal from the R/W 70 to obtain a received signal. The transmitting and receiving section 81 transmits the received signal thus obtained to the demodulating section 82.

The demodulating section 82 demodulates the received signal from the transmitting and receiving section 81 to obtain demodulated data. The demodulating section 82 supplies the demodulated data thus obtained to the controlling section 115.

On the other hand, in a case where the operation mode of the transponder 110 is normal mode and where the transponder 110 is to send the transmission target data to the R/W 70, the transponder 110 transmits the transmission target data through active load modulation.

More specifically, the R/W 70 transmits the transmission carrier.

In the transponder 110, the transmitting and receiving section 81 receives the transmission carrier from the R/W 70 to obtain a received signal. The transmitting and receiving section 81 supplies the received signal thus obtained to the synchronizing signal generating section 84.

The synchronizing signal generating section 84 generates a synchronizing signal synchronized with the received signal from the transmitting and receiving section 81, and supplies the generated synchronizing signal to the phase shifting section 116.

The phase shifting section 116 shifts the phase of the synchronizing signal from the synchronizing signal generating section 84 by the amount of phase shift controlled by the controlling section 115. The phase shifting section 116 supplies the phase-shifted synchronizing signal to the outputting section 86.

More specifically, the controlling section 115 causes the phase shifting section 116, for example, to adjust the amount of phase shift in order to control the intensity of the active load modulation signal in a manner reflecting the control parameters stored in the storing section 114.

Under control of the controlling section 115, the phase shifting section 116 adjusts the amount of phase shift. The phase shifting section 116 shifts the phase of the synchronizing signal from the synchronizing signal generating section 84 by the adjusted amount of phase shift, and supplies the phase-shifted synchronizing signal to the outputting section 86.

Under control of the controlling section 116, the outputting section 86 outputs the synchronizing signal from the phase shifting section 116 to the transmitting and receiving section 81 in accordance with the transmission target data.

Also under control of the controlling section 115, the outputting section 86 adjusts its gain and its output impedance.

More specifically, the controlling section 115 causes the outputting section 86 to adjust, for example, its gain and its output impedance to control the intensity of the active load modulation signal in accordance with the control parameters stored in the storing section 114.

Under control of the controlling section 116, the outputting section 86 adjusts its gain and its output impedance. The outputting section 86 outputs the synchronizing signal from the phase shifting section 116 to the transmitting and receiving section 81 in accordance with the transmission target data.

The transmitting and receiving section 81 converts the synchronizing signal output by the outputting section 86 into magnetic field changes and transmits the resulting magnetic field changes.

Transmission of the synchronizing signal by the transmitting and receiving section 81 in the transponder 110 causes the synchronizing signal sent from the transponder 110 to be combined with the transmission carrier sent from the transmitting and receiving section 76 in the R/W 70. Combining the transmission carrier with the synchronizing signal generates an active load modulation signal in which the transmission carrier is actively modulated with load in accordance with the transmission target data of the transponder 110.

The R/W 70 receives and demodulates the above-described active load modulation signal.

<Example of Operations in Test Mode>

Figure 8:
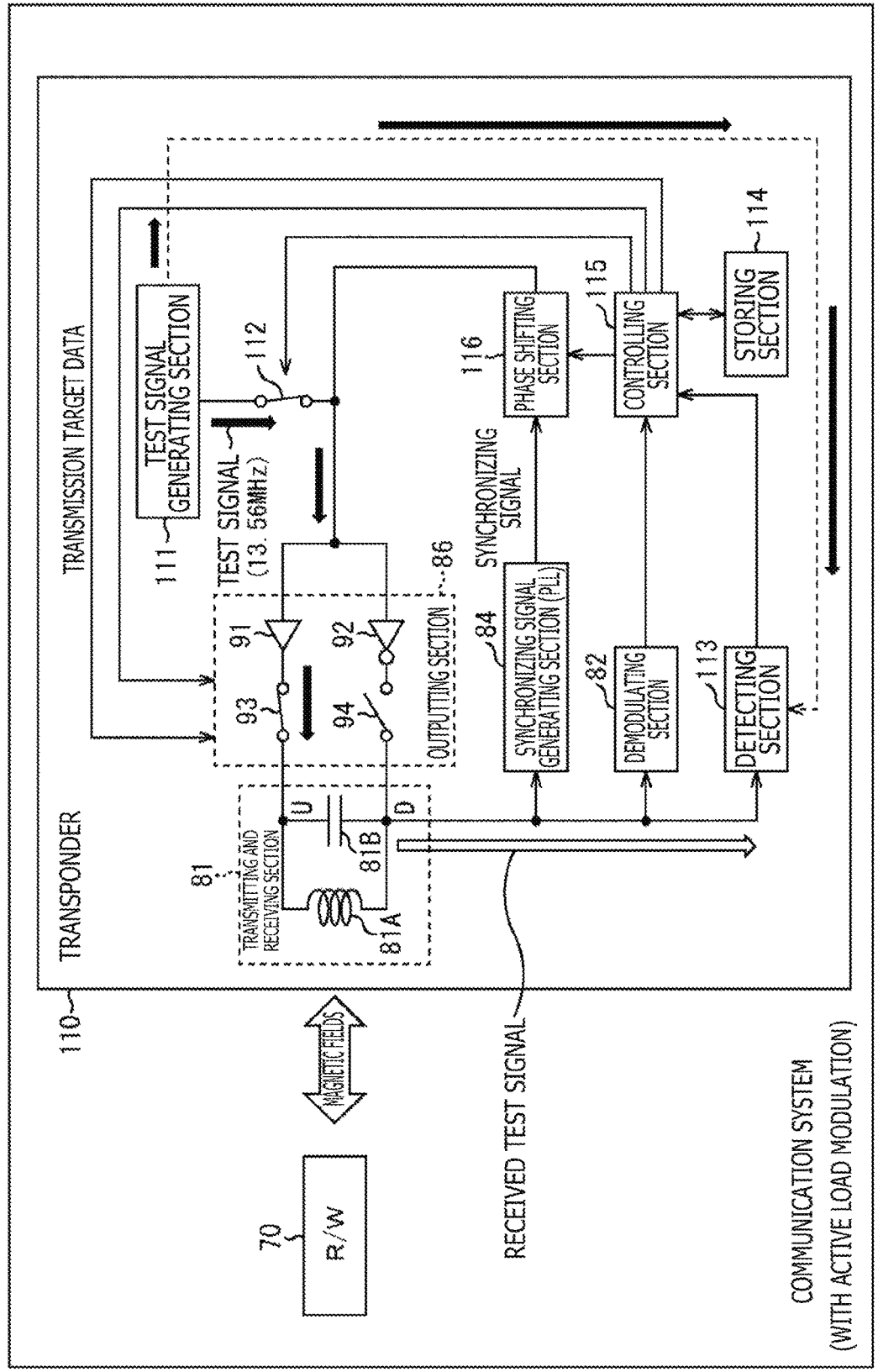
FIG. 8 is an explanatory diagram explaining an overview of an example of how a transponder 110 operates in a case where the mode of operation is test mode.

FIG. 8 is an explanatory diagram explaining an overview of an example of how the transponder 110 operates in a case where the operation mode is test mode.

For example, at the factory, the user checking the transponder 110 may operate the transponder 110 to set its operation mode to test mode. This causes the controlling section 115 to set the operation mode of the transponder 110 to test mode.

In test mode, the controlling section 115 turns on the switch 112 that remains off in normal mode.

Also in test mode, the controlling section 115 turns on one or both of the switches 93 and 94 that are turned on and off in normal mode in accordance with the transmission target data. In FIG. 8, only the switch 93 out of the two switches 93 and 94 is turned on.

Incidentally, as explained above with reference to FIG. 7, with each of the switches 93 and 94 configured with multiple MOSFETs, the controlling section 115 in normal mode may change the number of MOSFETs to be turned on in multiple MOSFETs as each of the switches 93 and 94 in accordance with the control parameters stored in the storing section 114 to adjust the output impedance of the outputting section 86 in controlling the intensity of the active load modulation signal. In such a case, the number of MOSFETs to be turned on in the switch 93 is controlled also in test mode in accordance with the control parameters stored in the storing section 114.

The switch 112 is turned on, thereby supplying the test signal output by the test signal generating section 111 to the outputting section 86. Incidentally, the test signal output by the test signal generating section 111 is supplied as needed to the detecting section 113.

As described above, the switch 93 is turned on in the outputting section 86. The test signal from the test signal generating section 111 is thus output to the transmitting and receiving section 81 via an amplifier 91 and the switch 93.

The transmitting and receiving section 81 receives the test signal from the outputting section 86 to obtain a received test signal. The received test signal thus obtained is output from the connecting point D to the detecting section 113.

The received test signal is obtained here by the transmitting and receiving section 81 upon receipt of the test signal. The received test signal is varied in amplitude and in phase with respect to the test signal in a manner reflecting the resonance frequency of the resonant circuit as the transmitting and receiving section 81, for example.

From the received test signal output by the transmitting and receiving section 81, the detecting section 113 detects as needed at least one of the influence parameters affecting the intensity of the active load modulation signal such as the current or the voltage of the received test signal and the phase difference between the received test signal and the test signal, by use of the test signal generated by the test signal generating section 111. The detecting section 113 then supplies the detected influence parameters to the controlling section 115.

In accordance with the influence parameters supplied form the detecting section 113, the controlling section 115 calculates at least one of the control parameters for controlling the intensity of the active load modulation signal such as the amount of phase shift for the phase shifting section 116, the gain of the outputting section 86, and the output impedance of the outputting section 86.

More specifically, the controlling section 115 calculates the amount of phase shift for the phase shifting section 116 and the gain and output impedance of the outputting section 86 as the control parameters in such a manner that the difference between the amplitude defined as $\sqrt{(A^2+B^2+2AB\cos(THETA))}$ of the active load modulation signal ALMS and the amplitude A of the transmission carrier A sin(wt) will be maximized in the expression (1).

The controlling section 115 then updates the control parameters stored in the storing section 114 using the control parameters calculated in accordance with the influence parameters.

Thereafter, the controlling section 115 sets (returns) the operation mode of the transponder 110 to normal mode.

In normal mode, as explained above with reference to FIG. 7, the transponder 110 transmits the transmission target data to the R/W 70 through active load modulation.

It is to be noted that the controlling section 115 adjusts the amount of phase shift for the phase shifting section 116, the gain of the outputting section 86, and the output impedance of the outputting section 86 to control the intensity of the active load modulation signal in a manner reflecting the updated control parameters stored in the storing section 114.

As described above, with the transponder 110 in test mode, the test signal is first generated. The received test signal is then obtained by the transmitting and receiving section 81 upon receipt of the test signal. From the received test signal, the influence parameters affecting the intensity of the active load modulation signal are detected. In accordance with the detected influence parameters, the control parameters for controlling the intensity of the active load modulation signal are calculated.

Thus, the appropriate values of the control parameters can be set for each individual transponder 110.

Furthermore, with the transponder 110 in normal mode, the intensity of the active load modulation signal is controlled in accordance with the control parameters calculated in test mode. This improves the deterioration of the communication performance attributable to variations in parts, for example, while minimizing increases in size and cost.

More specifically, the transponder 110 improves the deterioration of the communication performance due to variations in the coil 81A and the capacitor 81B included in the transmitting and receiving section 81. As a result, the robustness of the transponder 110 against such variations in its parts is improved.

Furthermore, whereas the transponder 110 needs the components ranging from the test signal generating section 111 to the phase shifting section 116, these components may be incorporated in a single-chip IC (Integrated Circuit) that occupies a small area and is low in cost in a case in which it is included in the transponder 110. Thus, compared with the case where the variable capacitor is provided as described in the cited PTL 1, any increases in size and cost are reduced.

Also, the transponder 110 has no need to adjust the resonance frequency of the resonant circuit as the transmitting and receiving section 81 in order to improve the deterioration of the communication performance due to variations in parts.

Furthermore, in a case where the transponder 110 includes an analog IC, not depicted, to process the received signal and the synchronizing signal synchronized with the received signal, there is no need to manage the delay time specific to the analog IC.

More specifically, in the transponder 80 in FIG. 5, the transponder 80 may include an analog IC, not depicted, to process the received signal and the synchronizing signal synchronized with the received signal. In such a case, the delay time of the analog IC shifts the phase of the synchronizing signal output by the outputting section 86 to the transmitting and receiving section 81. This requires each individual transponder 80 to manage the delay time of its analog IC and to determine the amount of phase shift for the phase shifting section 85 in consideration of the delay time.

By contrast, the transponder 110 in FIG. 7 calculates the suitable control parameters using the test signal. This eliminates the need for managing the delay time of the above-mentioned analog IC.

Consequently, the transponder 110 has no need for more time and effort to adjust the resonance frequency or manage the delay time. It follows that compared with the case where the resonance frequency is adjusted and the delay time is managed, the cost of manufacturing the transponder 110 is lowered.

Figure 9:
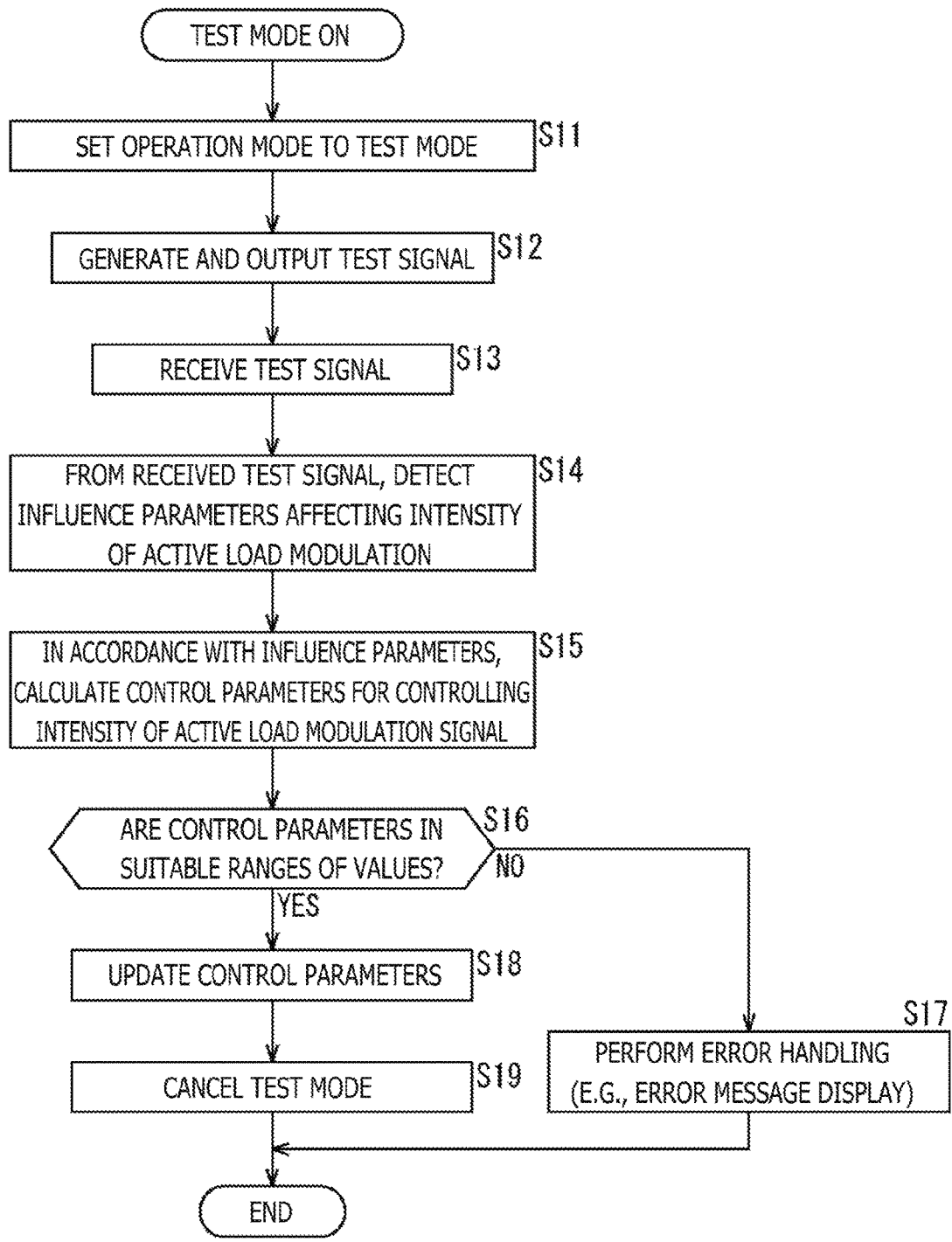
FIG. 9 is a flowchart explaining the example of how the transponder 110 operates in the case where the operation mode is test mode.

FIG. 9 is a flowchart explaining the example of how the transponder 110 operates in the case where the operation mode is test mode.

When the user operates the transponder 110 to set its operation mode to test mode, step S11 is reached. In step S11, the controlling section 115 sets the operation mode of the transponder 110 to test mode. Control is then transferred to step S12.

At this point, the controlling section 115 in test mode turns on the switch 112 and also turns on one or both of the switches 93 and 94 in the outputting section 86.

In step S12, the test signal generating section 111 starts generating and outputting the test signal. Control is the a transferred to step S13.

The test signal output by the test signal generating section 111 at this point is supplied to the outputting section 86 via the switch 112. Also, the test signal output by the test signal generating section 111 is supplied as needed to the detecting section 113.

As described above, at least one of the switches 93 and 94 is turned on in the outputting section 86. The test signal given by the test signal generating section 111 is thus output from the outputting section 86 to the transmitting and receiving section 81.

In step S13, the transmitting and receiving section 81 receives the test signal from the outputting section 86. The received test signal obtained by the transmitting and receiving section 81 upon receipt of the test signal is output to the detecting section 113. Control is transferred from step S13 to step S14.

In step S14, from the received test signal output by the transmitting and receiving section 81, the detecting section 113 detects as needed the current and voltage of the received test signal and the phase difference between the received test signal and the test signal as the influence parameters affecting the intensity of the active load modulation signal, using the test signal generated by the test signal generating section 111. The detecting section 113 supplies the detected influence parameters to the controlling section 115. Control is then transferred to step S15.

In step S15, the controlling section 115 calculates the amount of phase shift for the phase shifting section 116, the gain of the outputting section 86, and the output impedance of the outputting section 86 as the control parameters for controlling the intensity of the active load modulation signal in accordance with the influence parameters supplied from the detecting section 113.

Control is transferred from step S15 to step S16. In step S16, the controlling section 115 determines whether the control parameters calculated in the preceding step S15 are within the suitable ranges of values for the control parameters.

If it is determined in step S16 that the control parameters are not within the suitable ranges of values, i.e., that the control parameters are outside the suitable ranges, control is transferred to step S17. In step S17, the controlling section 115 performs predetermined error handling. This brings the processing to an end.

The error handling involves, for example, displaying an error message on a monitor, not depicted, and writing a value indicative of the error to a register, also not depicted.

In this case, there exist optimum values required by design for the control parameters. In practice, however, the control parameters vary due to variations in such parts as the coil 81A and capacitor 81B included in the transmitting and receiving section 81.

The ranges of the control parameters that vary due to such variations in the parts are predictable. If in step S15 any control parameter exceeding the predictable ranges is calculated, there is a high possibility that a component failure or a defective connection has occurred in the transponder 110.

Thus, if any of the control parameters calculated in step S15 is outside the above-mentioned predictable ranges of values, error handling is carried out. Performing the error handling allows the user checking the transponder 110 to easily recognize that the transponder 110 being checked is defective.

On the other hand, if it is determined in step S16 that the control parameters fall within the suitable ranges of values, i.e., that the control parameters have values within the suitable ranges, control is transferred to step S18.

In step S18, the controlling section 115 updates (corrects) the control parameters stored in the storing section 114 using the control parameters calculated in step S15. Control is then transferred to step S19.

In step S19, the controlling section 115 cancels test mode and sets (returns) the operation mode to normal mode. This brings the processing to an end.

<Examples of Operations in Normal Mode>

Figure 10:
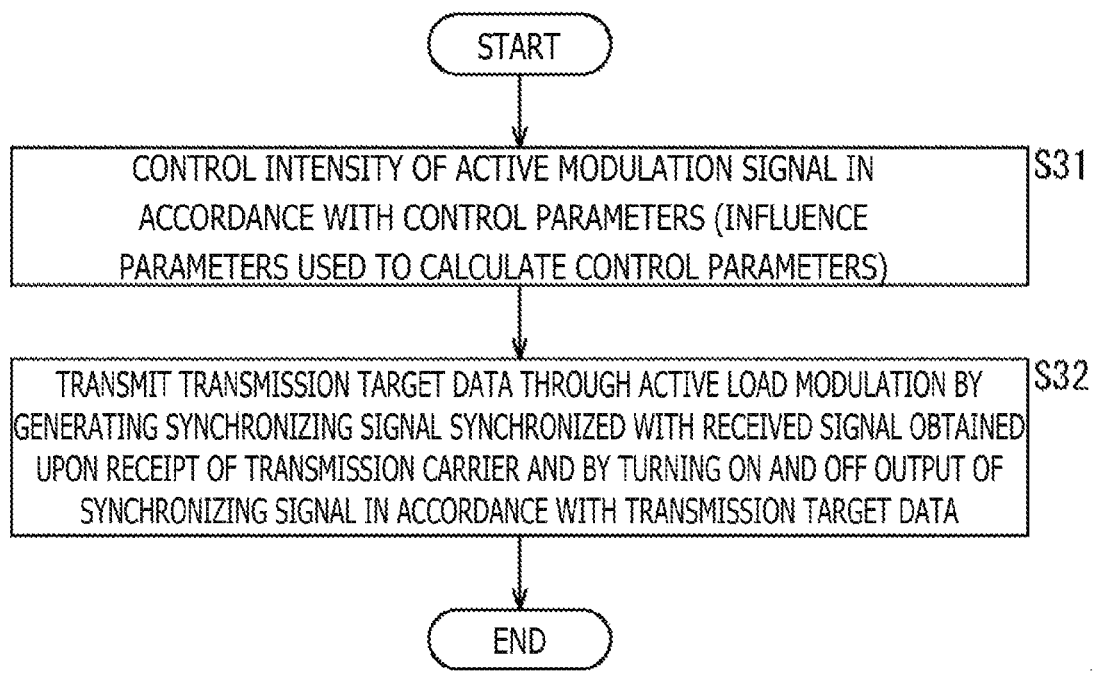
FIG. 10 is a flowchart explaining an example of how, in a case where the operation mode is normal mode, the transponder 110 operates to transmit transmission target data to the R/W 70.

FIG. 10 is a flowchart explaining an example of how, in a case where the operation mode is normal mode, the transponder 110 operates to transmit transmission target data to the R/W 70.

In step S31, the controlling section 115 adjusts the amount of phase shift for the phase shifting section 116, the gain of the outputting section 86, and the output impedance of the outputting section 86 to control the intensity of the active load modulation signal in a manner reflecting the updated control parameters stored in the storing section 114. Control is then transferred to step S32.

In step S32, the transponder 110 generates a synchronizing signal synchronized with the received signal obtained upon receipt of the transmission carrier from the R/W 70. The transponder 110 turns on and off the output of the generated synchronizing signal in accordance with the transmission target data so that the transmission target data will be transmitted to the R/W 70 through active load modulation.

More specifically, the transmitting and receiving section 81 receives the transmission carrier from the R/W 70 to obtain a received signal. The transmitting and receiving section 81 supplies the received signal thus obtained to the synchronizing signal generating section 84.

The synchronizing signal generating section 84 generates a synchronizing signal synchronized with the received signal from the transmitting and receiving section 81, and supplies the generated synchronizing signal to the phase shifting section 116.

The phase shifting section 116 shifts the phase of the synchronizing signal supplied from the synchronizing signal generating section 84 by the amount of phase shift controlled by the controlling section 115. The phase shifting section 116 supplies the phase-shifted synchronizing signal to the outputting section 86.

The outputting section 86 turns on and off the output of the synchronizing signal from the phase shifting section 116 to the transmitting and receiving section 81 in accordance with the transmission target data.

The transmitting ant receiving section 81 converts into magnetic field changes the synchronizing signal output by the outputting section 86, and transmits the resulting magnetic field changes.

Transmission of the synchronizing signal by the transmitting and receiving section 81 in the transponder 110 causes the synchronizing signal to be combined with the transmission carrier sent from the R/W 70. Combining the transmission carrier with the synchronizing signal generates an active load modulation signal in which the transmission carrier is actively modulated with load in accordance with the transmission target data of the transponder 110.

<Another Example of Operations in Test Mode>

Figure 11:
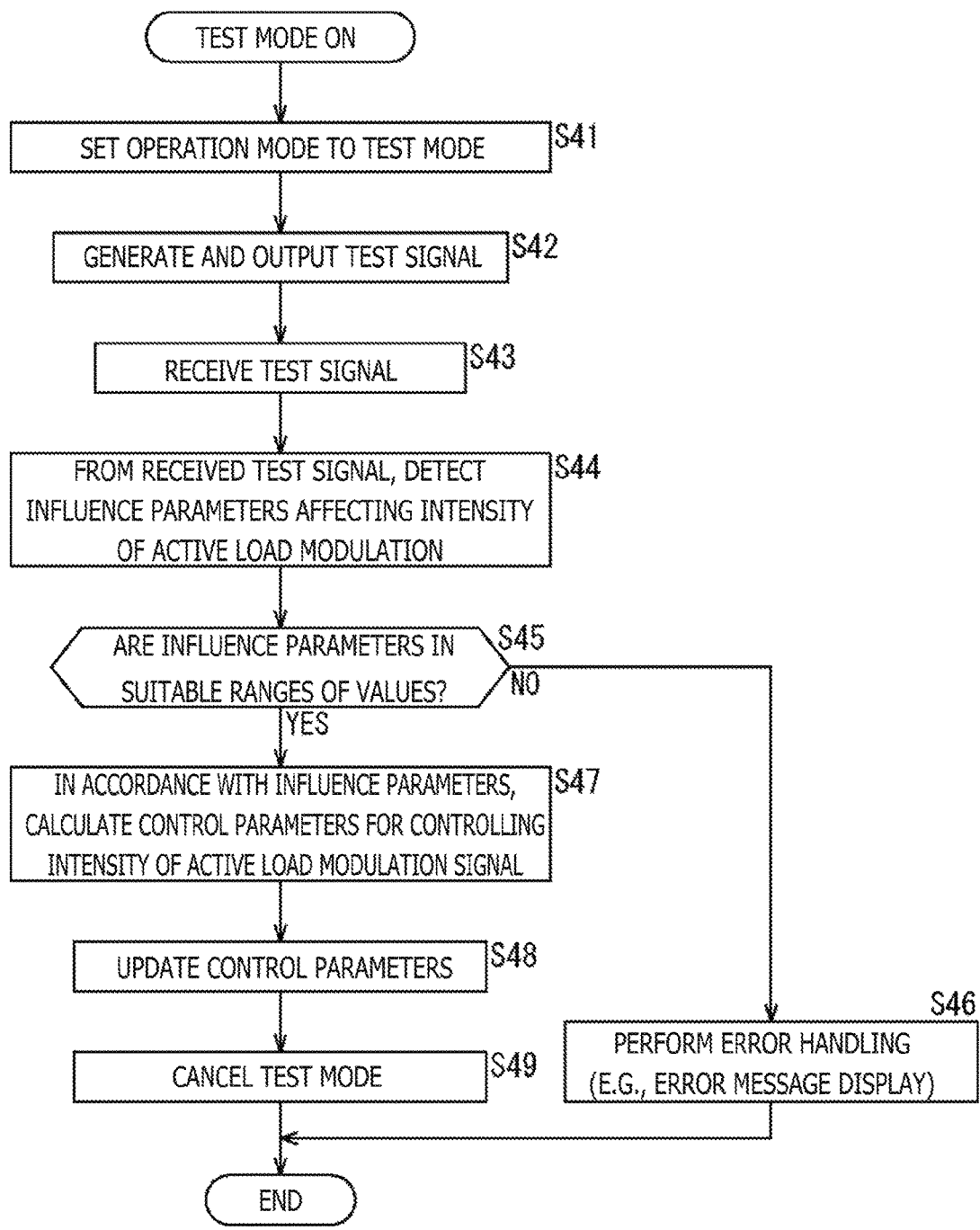
FIG. 11 is a flowchart explaining another example of how the transponder 110 operates in the case where the operation mode is test mode.

FIG. 11 is a flowchart explaining another example of how the transponder 110 operates in the case where the operation mode is test mode.

In this case in FIG. 9, it is determined whether the control parameters calculated by the controlling section 115 are within the suitable ranges of values. If the control parameters are determined to be outside the suitable ranges, error handling is carried out.

In FIG. 11, by contrast, it is determined whether the influence parameters detected by the detecting section 113 from the received test signal are within the suitable ranges of values. If the influence parameters are determined to be outside the suitable ranges, error handling is performed.

As described above, FIG. 9 is different from FIG. 11 in that the information used to determine whether or not to perform error handling is constituted by the control parameters in FIG. 9, whereas that information is the influence parameters in FIG. 11.

In steps S41 to S44, processes similar to those in steps S11 to S14 of FIG. 9 are carried out.

In step S44, the detecting section 113 detects the current and voltage of the received test signal and the phase difference between the received test signal and the test signal as the influence parameters affecting the intensity of the active load modulation signal, from the received test signal output by the transmitting and receiving section 81. The detecting section 113 supplies the detected influence parameters to the controlling section 115. Control is then transferred to step S45.

In step S45, the controlling section 115 determines whether the influence parameters detected in the preceding step S44 fall within the suitable ranges of values for the influence parameters.

If it is determined in step S45 that the influence parameters do not fall within the suitable ranges of values, i.e., that the influence parameters are outside the suitable ranges, control is transferred to step S46. The controlling section 115 performs error handling similar to that in step S17 of FIG. 9. This brings the processing to an end.

In this case, there exist the values required by design (design values) for the current and voltage of the received signal and for the phase difference between the received test signal and the received signal. In practice, however, the influence parameters vary due to variations in such parts as the coil 81A and capacitor 81B included in the transmitting and receiving section 81.

The ranges of the influence parameters that vary due to such variations in the parts are predictable. If in step S44 any influence parameter exceeding the predictable ranges is detected, there is a high possibility that a component failure or a defective connection has occurred in the transponder 110.

Thus, if any of the influence parameters detected in step S44 is outside the above-mentioned predictable ranges of values, error handling is carried out. Performing the error handling allows the user checking the transponder 110 to easily recognize that the transponder 110 being checked is defective.

On the other hand, if it is determined in step S45 that the influence parameters fall within the suitable ranges of values, control is transferred to step S47.

In step S47, as in step S15 of FIG. 9, the controlling section 115 calculates the amount of phase shift for the phase shifting section 116, the gain of the outputting section 86, and the output impedance of the outputting section 86 as the control parameters for controlling the intensity of the active load modulation signal in accordance with the influence parameters supplied from the detecting section 113.

Control is then transferred from step S47 to step S48. In steps S48 and S49, processes similar to those in steps S18 and S19 of FIG. 9 are carried out. This brings the processing to an end.

Figure 12:
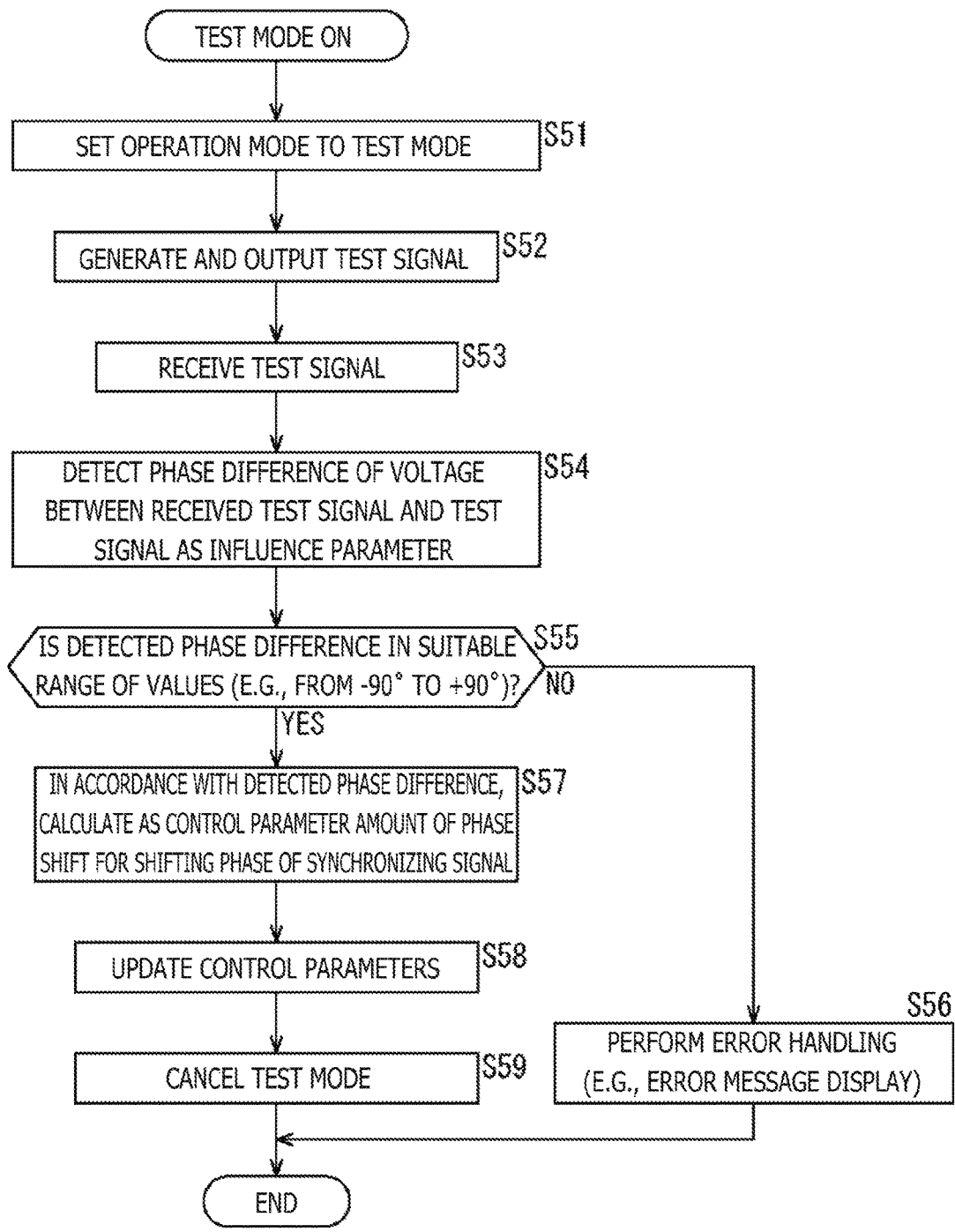
FIG. 12 is a flowchart explaining an example of how the transponder 110 in test mode operates to adjust the amount of phase shift performed by a phase shifting section 116 in controlling the intensity of an active load modulation signal.

FIG. 12 is a flowchart explaining an example of how the transponder 110 in test mode operates to adjust the amount of phase shift performed by the phase shifting section 116 in controlling the intensity of the active load modulation signal.

In steps S51 to S53, processes similar to those in steps S41 to S43 of FIG. 11 are carried out. In turn, the transmitting and receiving section 81, which obtains a received test signal upon receipt of the test signal output by the outputting section 86, outputs the received test signal to the detecting section 113. Control is then transferred to step S54.

In step S54, the detecting section 113 detects, given the received test signal output by the transmitting and receiving section 81 and using the test signal generated by the test signal generating section 111, the phase difference (of voltage) between the received test signal and the test signal, i.e., the phase shift caused by the test signal passing through the outputting section 86 and the transmitting and receiving section 81, the phase difference being the influence parameter affecting the intensity of the active load modulation signal. The detecting section 113 supplies the detected phase difference to the controlling section 115. Control is then transferred to step S55.

In step S55, the controlling section 115 determines whether the phase difference between the received test signal and the test signal detected in the preceding step S54 (the difference may be referred to as the detected phase difference hereunder) as the influence parameter falls within the suitable range of values, e.g., within a range of values ranging from approximately −90 degrees to +90 degrees.

If it is determined in step S55 that the detected phase difference is not within the suitable range of values, control is transferred to step S56. In step S56, the controlling section 115 performs error handling similar to that in step S46 of FIG. 11. This brings the processing to an end.

On the other hand, if it is determined in step S55 that the detected phase difference falls within the suitable range of values, control is transferred to step S57.

In step S57, the controlling section 115 calculates the amount of phase shift for the phase shifting section 116 as the control parameter for controlling the intensity of the active load modulation signal in accordance with the detected phase difference supplied from the detecting section 113.

More specifically, if the phase of the received test signal obtained by passage of the test signal through the outputting section 86 and the transmitting and receiving section 81 is recognized from the detected phase difference to lead the normal value by 30 degrees, for example, then the controlling section 115 calculates −30 degrees by which to delay (compensate) the phase as the amount of compensation for compensating the phase.

If it is assumed here that the suitable design value of the amount of phase shift for the phase shifting section 116 is −180 degrees indicating that the phase is to be delayed by 180 degrees, then the suitable design value of −180 degrees is the normal value of the phase of the received test signal. This value is stored into the storing section 114 as the initial value of the amount of phase shift as the control parameter.

In this case, the controlling section 115 calculates −210 degrees indicting that the phase is to be delayed by 210 degrees as the amount of phase shift serving as the control parameter, the calculation being made by adding the compensation amount of −30 degrees to −180 degrees stored as the initial value of the amount of phase shift in the storing section 114.

Control is then transferred from step S57 to step S58. In step S58, the controlling section 115 updates the control parameters stored in the storing section 114 using the control parameter calculated in step S57. Control is transferred from step S58 to step S59.

More specifically, the controlling section 115 updates the initial value of the amount of phase shift as the control parameter stored in the storing section 114 using, for example, the amount of phase shift of −210 degrees as the control parameter calculated from the detected phase difference as described above.

In step S59, as in step S49 of FIG. 11, the controlling section 115 cancels test mode and sets the operation mode to normal mode. This brings the processing to an end.

Figure 13:
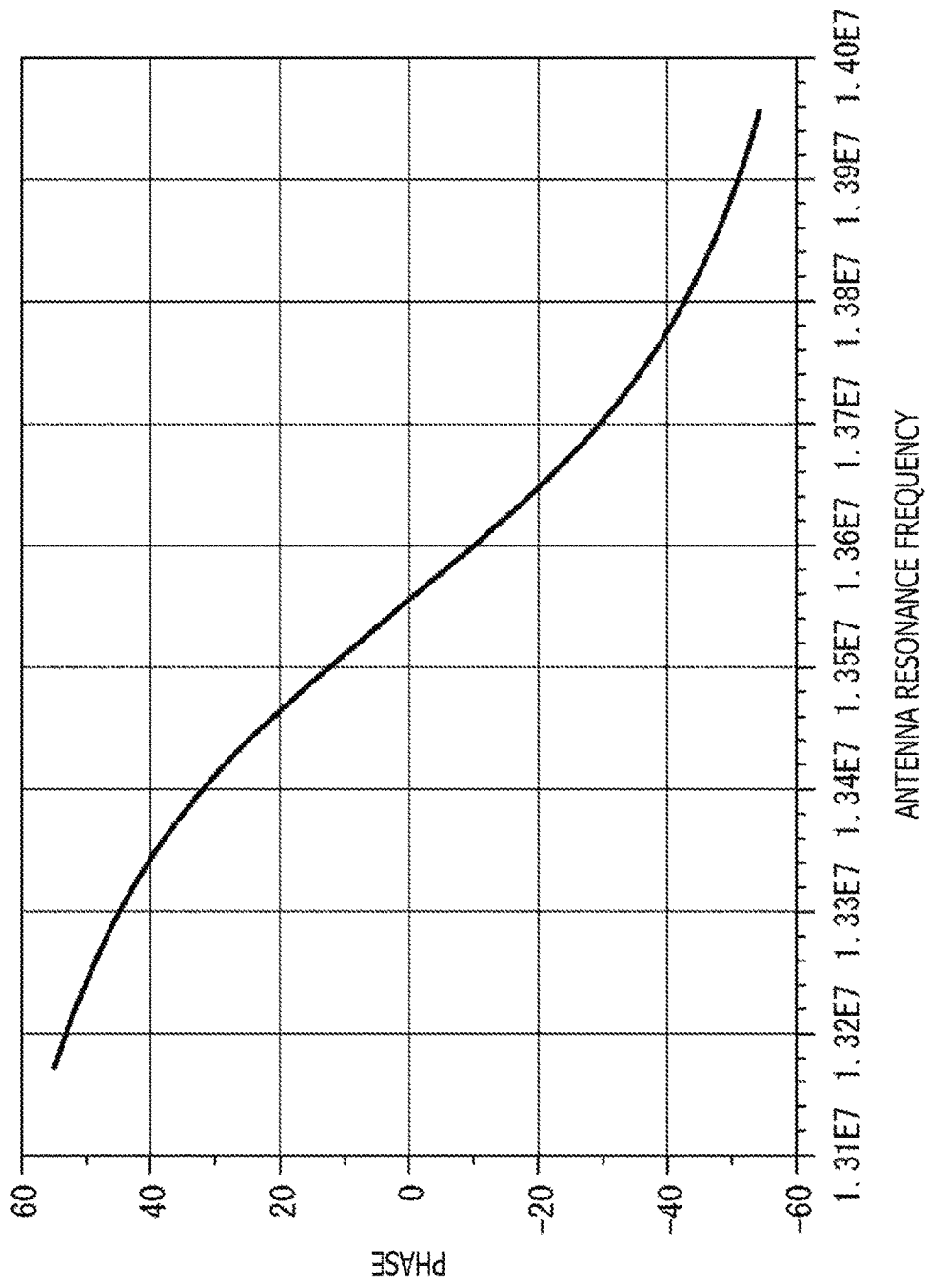
FIG. 13 is a graphic representation depicting the results of simulations on the relations between phase on the one hand and the resonance frequency of a resonant circuit acting as a transmitting and receiving section 81 on the other hand.

FIG. 13 is a graphic representation depicting the results of simulations on the relations between the resonance frequency of the resonant circuit as the transmitting and receiving section 81 on the one hand and the phase of the received test signal on the one hand.

Incidentally in FIG. 13, the horizontal axis denotes the resonance frequency (antenna resonance frequency) of the resonant circuit as the transmitting and receiving section 81, and the vertical axis represents the phase of the received test signal in reference (=0) to 13.56 MHz of the resonance frequency as the design value.

From FIG. 13, it can be seen that the phase of the received test signal is approximately +30 degrees in a case where variations in parts, for example, cause the resonance frequency of the resonant circuit as the transmitting and receiving section 81 to deviate from the design value of 13.56 KHz to 13.4 MHz.

More specifically, in the case where the resonance frequency of the resonant circuit as the transmitting and receiving section 81 deviates from the design value of 13.56 MH to 13.4 MHz, the signal passing through the transmitting and receiving section 81 has its phase advanced by approximately 30 degrees compared with the case where the resonance frequency does not deviate.

For that reason, the phase of the synchronizing signal generated by the synchronizing signal generating section 84 and synchronized with the received signal leads the design value by approximately 30 degrees. This can lead to the generation of the amplitude NULL, for example, deteriorating the communication performance with active load modulation.

In FIG. 12, the amount of phase shift as the control parameter stored in the storing section 114 is updated with the control parameter that cancels the phase advanced by approximately 30 degrees as described above. As a result, the deterioration of the communication performance due to variations in parts is improved.

Incidentally, whereas in FIG. 12 the control parameter for updating the corresponding control parameter stored in the storing section 114 (the new control parameter may be referred to as the updating parameter hereunder) is calculated by adding the amount of compensation obtained from the detected phase difference to the initial value of the corresponding control parameter in the storing section 114, the updating parameter may also be acquired using a map and a function, for example.

More specifically, a map (table) in which the detected phase difference and the amount of compensation are associated with the updating parameter is obtained beforehand, and so is a function which receives input of the detected phase difference and the amount of compensation and which outputs the updating parameter. The updating parameter is then obtained using the map and the function, given the detected phase difference and the amount of compensation.

FIG. 14 is a flowchart explaining an example of how the transponder 110 in test mode operates to adjust the output impedance of the outputting section 86 in controlling the intensity of the active load modulation signal.

In steps S61 to S64, processes similar to those in steps S51 to S54 of FIG. 12 are carried out. This allows the detecting section 113 to detect the phase difference as the influence parameter affecting the intensity of the active load modulation signal, i.e., the detected phase difference (of voltage) between the received test signal and the test signal, given the received test signal output by the transmitting and receiving section 81 and using the test signal generated by the test signal generating section 111. The detecting section 113 supplies the detected phase difference to the controlling section 115. Control is then transferred to step S65.

In step S65, the controlling section 115 determines whether the detected phase difference is in a first range of values ranging, for example, from approximately −5 to +5 degrees within the suitable range of values ranging, for example, from approximately −45 to +45 degrees.

If it is determined in step S65 that the detected phase difference is in the first range, control is transferred to step S66.

In step S66, in accordance with the detected phase difference supplied from the detecting section 113, the controlling section 115 sets (calculates), for example, a default value of the output impedance of the outputting section 86 constituted by the design value of the output impedance as the updating parameter for controlling the intensity of the active load modulation signal.

More specifically, in a case where the resonance frequency of the resonant circuit as the transmitting and receiving section 81 approximately matches the design value of the resonance frequency so that the detected phase difference close to 0 degrees falls in the first range, the intensity of active load modulation is not appreciably lower than the design value of the intensity of active load modulation. In this case, the default value of the output impedance constituted by its design value is used as the output impedance serving as the updating parameter.

Thereafter, control is transferred from step S66 to step S67. In step S67, the controlling section 115 updates the control parameter stored in the storing section 114 using the updating parameter. Control is then transferred to step S68.

In step S68, as in step S59 of FIG. 12, the controlling section 115 cancels test mode and sets the operation mode to normal mode. This brings the processing to an end.

On the other hand, if it is determined in step S65 that the detected phase difference is not in the first range of values, i.e., that the detected phase difference is outside the first range, control is transferred to step S69.

In step S69, the controlling section 115 determines whether the detected phase difference is in a second range of values which is wider than the first range and which ranges, for example, from approximately −15 to +15 degrees within the suitable range of values.

If it is determined in step S69 that the detected phase difference is within the second range of values, control is transferred to step S70.

In step S70, in accordance with the detected phase difference supplied from the detecting section 113, the controlling section 115 calculates, for example, a first correction value obtained by correcting the default value by a first value as the output impedance of the outputting section 86 serving as the updating parameter for controlling the intensity of the active load modulation signal.

More specifically, in a case where the resonance frequency of the resonant circuit as the transmitting and receiving section 81 deviates a little from the design value of the resonance frequency so that the detected phase difference is within the second range of values exceeding the first range, the intensity of active load modulation is expected to be a little lower than the design value of the intensity of active load modulation. In this case, the first correction value obtained by correcting the default value constituted by the design value of the output impedance is used as the output impedance serving as the updating parameter.

Used at this point as the first correction value the value by which to increase the current flowing through the transmitting and receiving section 81, the value being representative of the amount by which to compensate the expected drop in the intensity of active load modulation due to the deviation of the resonance frequency of the resonant circuit as the transmitting and receiving section 81 by the second range of values from the design value of the resonance frequency. Thus, the first correction value is smaller than the default value of the output impedance constituted by its design value.

Thereafter, control is transferred from step S70 to step S67. In steps S67 and S68, the processes discussed above are carried out.

If it is determined in step S69 that the detected phase difference is not within the second range of values, i.e., that the detected phase difference is outside the second range, control is transferred to step S71.

In step S71, the controlling section 115 determines whether the detected phase difference is in a third range of values which is wider than the second range and which ranges, for example, from approximately −45 to +45 degrees within the suitable range of values.

If it is determined in step S71 that the detected phase difference is within the third range of values, control is transferred to step S72.

In step S72, in accordance with the detected phase difference supplied from the detecting section 113, the controlling section 115 calculates, for example, a second correction value obtained by correcting the default value by a second value, as the output impedance of the outputting section 86 serving as the updating parameter for controlling the intensity of the active load modulation signal.

More specifically, in a case where the resonance frequency of the resonant circuit as the transmitting and receiving section 81 deviates further from the design value of the resonance frequency so that the detected phase difference is in the third range of values exceeding the second range, the intensity of active load modulation is expected to be appreciably lower than the design value of the intensity of active load modulation. In this case, the second correction value obtained by correcting the default value constituted by the design value of the output impedance by a larger amount than the first correction value is used as the output impedance serving as the updating parameter.

Thus, the second correction value is smaller than the value by which to increase the current flowing through the transmitting and receiving section 81, i.e., smaller than the first correction value.

Control is then transferred from step S72 to step S67. In steps S67 and S68, the processes discussed above are carried out.

On the other hand, if it is determined in step S71 that the detected phase difference is not in the third range, i.e., that the detected phase difference is outside the suitable range of values, there is a high possibility of a component failure or a defective connection having occurred in the transponder 110. In that case, control is transferred to step S73.

In step S73, the controlling section 115 performs error handling similar to that in step S56 of FIG. 12. This brings the processing to an end.

In this description, the term "system" refers to an aggregate of multiple components (e.g., devices or modules (parts)). It does not matter whether or not all components are housed in the same enclosure. Thus, a system may be configured with multiple devices housed in separate enclosures and interconnected via a network, as well as with a single device that houses multiple modules in a single enclosure.

The present technology is not limited to the embodiment described above and may be varied or modified diversely within the spirit and scope of the technology.

For example, the present technology may be applied not only to transponders that perform active load modulation alone for the purpose of modulation, but also to transponders that switch between active load modulation and other type of modulation such as passive load modulation as needed.

Also, the advantageous effects stated in this description are only examples and not limitative of the present technology that may also provide other advantages.

Incidentally, the present technology may be configured as follows:

<1>

A communication apparatus including:

a test signal generating section configured to generate a predetermined test signal;

a detecting section configured to detect an influence parameter affecting the intensity of an active load modulation signal that combines a transmission carrier transmitted by another communication apparatus and received by a transmitting and receiving section with a synchronizing signal transmitted by the transmitting and receiving section in synchronism with a received signal obtained upon receipt of the transmission carrier, the influence parameter being detected from a received test signal obtained upon receipt of the test signal; and a controlling section configured to control the intensity of the active load modulation signal is accordance with the influence parameter.

<2>

The communication apparatus as stated in paragraph <1> above, in which the detecting section detects the voltage and current of the received test signal or a phase difference between the received test signal and the test signal as the influence parameter.

<3>

The communication apparatus as stated in paragraph. <1> or <2> above, further including:

a synchronizing signal generating section configured to generate the synchronizing signal; and a phase shifting section configured to shift the phase of the synchronizing signal, in which the controlling section controls the intensity of the active load modulation signal by adjusting, is accordance with the influence parameter, an amount of phase shift by which the phase shifting section shifts the phase of the synchronizing signal.

<4>

The communication apparatus as stated in paragraph <1> or <2> above, further including:

a synchronizing signal generating section configured to generate the synchronizing signal; and an outputting section configured to turn on and off the output of the synchronizing signal to the transmitting and receiving section in accordance with transmission target data, in which the controlling section controls the intensity of the active load modulation signal by adjusting the output impedance or the gain of the outputting section in accordance with the influence parameter.

<5>

The communication apparatus as stated in any one of paragraphs <1> to <4> above, in which the controlling section performs predetermined error handling in a case where the influence parameter is outside a predetermined range of values.

<6>

The communication apparatus as stated in any one of paragraphs <1> to <4> above, in which the controlling section calculates a control parameter for controlling the intensity of the active load modulation signal in accordance with the influence parameter, controls the intensity of the active load modulation signal in accordance with the control parameter, and performs predetermined error handling in a case where the control parameter is outside a predetermined range of values.

<7>

The communication apparatus as stated in any one of paragraphs <1> to <6> above, in which the communication apparatus performs short-range wireless communication using magnetic fields.

<8>

A communication method including:

generating a predetermined test signal; and detecting an influence parameter affecting the intensity of an active load modulation signal that combines a transmission carrier transmitted by another communication apparatus and received by a transmitting and receiving section with a synchronizing signal transmitted by the transmitting and receiving section in synchronism with a received signal obtained upon receipt of the transmission carrier, the influence parameter being detected from a received test signal obtained upon receipt of the test signal, in which the intensity of the active load modulation signal is controlled in accordance with the influence parameter.

<9>

A communication method including:

generating a predetermined test signal; and detecting an influence parameter affecting the intensity of an active load modulation signal that combines a transmission carrier transmitted by another communication apparatus and received by a transmitting and receiving section with a synchronizing signal transmitted by the transmitting and receiving section in synchronism with a received signal obtained upon receipt of the transmission carrier, the influence parameter being detected from a received test signal obtained upon receipt of the test signal;

thereby controlling the intensity of the active load modulation signal in accordance with the influence parameter thus obtained.

REFERENCE SIGNS LIST

10 R/W
11 Carrier generating section
12 Modulating section
13 Amplifier
14 Resistor
15 Transmitting and receiving section
15A Coil
15B Capacitor
16 Demodulating section
20 Transponder
21 Transmitting and receiving section
21A Coil
21B Capacitor
22 Provision
23 Demodulating section
24 Resistor
25 MOSFET
31 Transmission system
32 Reception system
41 Carrier generating section
42, 43 Capacitor
44 Coil
45 Capacitor
46 Demodulating section
51 Coil
52 Capacitor
53 Resistor
54 Synchronizing signal generating section
55 Switch
70 R/W
71 Carrier generating section
72, 73 Buffer
74, 75 Capacitor
76 Transmitting and receiving section
76A Coil
76B Capacitor
77 Demodulating section
80 Transponder
81 Transmitting and receiving section
81A Coil
81B Capacitor
82 Demodulating section 83 Controlling section
84 Synchronizing signal generating section
85 Phase shifting section
86 Outputting section
91, 92 Buffer
93, 94 Switch
110 Transponder
111 Test signal generating section
112 Switch
113 Detecting section
114 Storing section
115 Controlling section
116 Phase shifting section

The invention claimed is:

1. A communication apparatus comprising:
   a test signal generating section configured to generate a predetermined test signal;
   a detecting section configured to detect an influence parameter affecting the intensity of an active load modulation signal that combines a transmission carrier transmitted by another communication apparatus and received by a transmitting and receiving section with a synchronizing signal transmitted by the transmitting and receiving section in synchronism with a received signal obtained upon receipt of the transmission carrier, the influence parameter being detected from a received test signal obtained upon receipt of the test signal; and
   a controlling section configured to control the intensity of the active load modulation signal in accordance with the influence parameter.

2. The communication apparatus according to claim 1, wherein the detecting section detects the voltage and current of the received test signal or a phase difference between the received test signal and the test signal as the influence parameter.

3. The communication apparatus according to claim 1, further comprising:
   a synchronizing signal generating section configured to generate the synchronizing signal; and
   a phase shifting section configured to shift the phase of the synchronizing signal,
   wherein the controlling section controls the intensity of the active load modulation signal by adjusting, in accordance with the influence parameter, an amount of phase shift by which the phase shifting section shifts the phase of the synchronizing signal.

4. The communication apparatus according to claim 1, further comprising:
   a synchronizing signal generating section configured to generate the synchronizing signal; and
   an outputting section configured to turn on and off the output of the synchronizing signal to the transmitting and receiving section in accordance with transmission target data,
   wherein the controlling section controls the intensity of the active load modulation signal by adjusting the output impedance or the gain of the outputting section in accordance with the influence parameter.

5. The communication apparatus according to claim 1, wherein the controlling section performs predetermined error handling in a case where the influence parameter is outside a predetermined range of values.

6. The communication apparatus according to claim 1,
   wherein the controlling section
   calculates a control parameter for controlling the intensity of the active load modulation signal in accordance with the influence parameter,
   controls the intensity of the active load modulation signal in accordance with the control parameter, and
   performs predetermined error handling in a case where the control parameter is outside a predetermined range of values.

7. The communication apparatus according to claim 1, wherein the communication apparatus performs short-range wireless communication using magnetic fields.

8. A communication method comprising:
   generating a predetermined test signal; and
   detecting an influence parameter affecting the intensity of an active load modulation signal that combines a transmission carrier transmitted by another communication apparatus and received by a transmitting and receiving section with a synchronizing signal transmitted by the transmitting and receiving section in synchronism with a received signal obtained upon receipt of the transmission carrier, the influence parameter being detected from a received test signal obtained upon receipt of the test signal,
   wherein the intensity of the active load modulation signal is controlled in accordance with the influence parameter.

9. A communication method comprising:
   generating a predetermined test signal; and
   detecting an influence parameter affecting the intensity of an active load modulation signal that combines a transmission carrier transmitted by another communication apparatus and received by a transmitting and receiving section with a synchronizing signal transmitted by the transmitting and receiving section in synchronism with a received signal obtained upon receipt of the transmission carrier, the influence parameter being detected from a received test signal obtained upon receipt of the test signal;
   thereby controlling the intensity of the active load modulation signal in accordance with the influence parameter thus obtained.

* * * * *